United States Patent
Basham et al.

(10) Patent No.: US 11,642,622 B2
(45) Date of Patent: May 9, 2023

(54) CONTAMINATION RESISTANT REGENERABLE DESICCANT MEMBER COMPRISING A BENTONITE MATERIAL

(71) Applicant: W. L. Gore & Associates, Inc., Newark, DE (US)

(72) Inventors: Daniel E. Basham, Newark, DE (US); John P. Colarusso, Newark, DE (US); Kyle Doce, Newark, DE (US); Samuel A. Thompson, Newark, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 321 days.

(21) Appl. No.: 16/627,502

(22) PCT Filed: Jul. 6, 2018

(86) PCT No.: PCT/US2018/041114
§ 371 (c)(1),
(2) Date: Dec. 30, 2019

(87) PCT Pub. No.: WO2019/010433
PCT Pub. Date: Jan. 10, 2019

(65) Prior Publication Data
US 2020/0164304 A1    May 28, 2020

Related U.S. Application Data

(60) Provisional application No. 62/544,407, filed on Aug. 11, 2017, provisional application No. 62/529,199, filed on Jul. 6, 2017.

(51) Int. Cl.
*B01D 53/02* (2006.01)
*B01D 53/26* (2006.01)
*F24F 3/14* (2006.01)

(52) U.S. Cl.
CPC .......... *B01D 53/261* (2013.01); *B01D 53/02* (2013.01); *B01D 2253/106* (2013.01);
(Continued)

(58) Field of Classification Search
CPC .......... B01D 2253/106; B01D 2253/11; B01D 2253/202; B01D 2253/25; B01D 2257/80;
(Continued)

(56) References Cited

U.S. PATENT DOCUMENTS 4,162,146 A * 7/1979 Seibert .................. B01D 53/04
96/113
4,231,768 A * 11/1980 Seibert .................. B01D 39/14
210/DIG. 5
(Continued)

FOREIGN PATENT DOCUMENTS

AU    2010212526 A1    3/2011
CN       1345628 A     4/2002
(Continued)

OTHER PUBLICATIONS

International Search Report and Written Opinion for International Application No. PCT/US2018/041114 dated Jul. 6, 2018.
(Continued)

*Primary Examiner* — Christopher P Jones

(57) ABSTRACT

A desiccant member is disclosed that comprises a polymer material and a bentonite material. The desiccant member is capable of absorbing moisture from an atmosphere containing siloxanes, organic compounds having a boiling point greater than 60 C, or mixtures thereof. The desiccant member is contamination resistant and may be regenerable. The desiccant member may have a high working moisture capacity that is suited for demanding environments.

18 Claims, 18 Drawing Sheets

(52) U.S. Cl.
CPC ...... *B01D 2253/25* (2013.01); *B01D 2257/80* (2013.01); *B01D 2279/45* (2013.01); *F24F 3/1411* (2013.01)

(58) Field of Classification Search
CPC .... B01D 2279/45; B01D 53/02; B01D 53/26; B01D 53/261; F24F 3/1411
See application file for complete search history.

(56) References Cited

U.S. PATENT DOCUMENTS

| | | | |
|---|---|---|---|
| 4,830,643 | A | 5/1989 | Sassa et al. |
| 4,985,296 | A | 1/1991 | Mortimer, Jr. |
| 5,500,038 | A | 3/1996 | Dauber et al. |
| 5,593,482 | A | 1/1997 | Dauber et al. |
| 5,667,560 | A | 9/1997 | Dunne |
| 6,210,014 | B1 | 4/2001 | Kubizne et al. |
| 6,235,219 | B1 | 5/2001 | Beckenhauer |
| 6,290,758 | B1 | 9/2001 | Mowat |
| 6,352,578 | B1 | 3/2002 | Sakata et al. |
| 6,709,493 | B2 | 3/2004 | Deguiseppi et al. |
| 7,306,659 | B2 | 12/2007 | Gorton et al. |
| 8,968,063 | B2 | 3/2015 | Gifford et al. |
| 2003/0154865 | A1* | 8/2003 | Zornes ............... B01J 20/2803 252/62.51 R |
| 2007/0197711 | A1 | 8/2007 | Udo et al. |
| 2008/0251395 | A1* | 10/2008 | Defedericis ........... B29C 66/114 53/450 |
| 2009/0054232 | A1 | 2/2009 | Dick et al. |
| 2009/0321028 | A1* | 12/2009 | Takaoka ................ D21H 11/18 162/146 |
| 2012/0285328 | A1* | 11/2012 | Kirtikar ................ B01J 20/041 53/473 |
| 2015/0336047 | A1* | 11/2015 | Billiet ................. B01J 20/2803 95/91 |
| 2016/0363331 | A1 | 12/2016 | Keough et al. |
| 2018/0169616 | A1* | 6/2018 | Flaugher ................ B01J 20/18 |
| 2019/0308132 | A1* | 10/2019 | Okumura ............... B01D 53/26 |

FOREIGN PATENT DOCUMENTS

| | | |
|---|---|---|
| DE | 102006006099 A1 | 8/2007 |
| EP | 1818609 A2 | 8/2007 |
| JP | 04-323007 A | 11/1992 |
| JP | 2007-538392 A | 12/2007 |
| JP | 2013-158668 A | 8/2013 |
| KR | 10-0836307 B1 | 6/2008 |
| WO | 97/27042 A1 | 7/1997 |
| WO | 2016/201045 A1 | 12/2016 |

OTHER PUBLICATIONS

Dawson, "Bentonite Clay vs. Silica Gel Desiccants James Dawson USA Canada", Feb. 23, 2015; <<https://www.jamesdawson.com/blog/index.php?mode=post&id=6>> retrieved Oct. 23, 2018.
Sud-Chemie Inc., "Desiccant Requirements Pharmaceuticals", Dec. 31, 2004, pp. 1-4.
Sarkar et al., "Polypropylene-clay composite prepared from Indian bentonite", Bulletin of Materials Science, vol. 31, No. 1, Feb. 2008, pp. 23-28.
Mittal, "Polyurethane-Bentonite Nanocomposites: Morphology and Oxygen Permeation", Advances in Polymer Technology, vol. 00, No. 00, 2014.
Kalaeh et al., "Preparation of a clay based superabsorbent polymer composite of copolymer poly (acrylate-co-acrylamide) with bentonite via microwave radiation", Research & Reviews on Polymer, vol. 4, Iss. 4, 2013, pp. 145-150.
Johansson et al., "Hydrophobically modified poly(vinyl alcohol) and bentonite nanocomposites thereof: Barrier, mechanical, and aesthetic properties", Journal of Applied Polymer Science, 2015.
Kenyo et al., "Functional packaging materials: factors affecting the capacity and rate of water absorption in desiccant compositions", Journal of Polymer Research, vol. 20, No. 11, Oct. 19, 2013.
Anonymous: "Desiccant Chart Comparisons," Sorbent Systems, Jan. 1, 2006 , pp. 4.
Hernandez-Hernandez et al., "Polymer-Clay Nanocomposites and Composites: Structures, Characteristics, and their Applications in the Removal of Organic Compounds of Environmental Interest," Medicinal chemistry. vol. 6, No. 3, Mar. 29, 2016, pp. 201-210.
Lama et al., "Experimental Study On Sorption Behavior of Desiccants," International Journal of Advanced Research, vol. 5, No. 3, Mar. 31, 2017, pp. 599-607.
Ollier et al., "Unsaturated polyester/bentonite nanocomposites: Influence of clay modification on final performance," Composites: Part A, vol. 48, Jan. 29, 2013, pp. 137-143.
Park et al., "Application of montmorillonite in bentonite as a pharmaceutical excipient in drug delivery systems," Journal of Pharmaceutical Investigation, vol. 46, May 21, 2016, pp. 363-375.
Sud-Chemie, "Desiccant Performance Data," Jan. 1, 2011, pp. 2.

* cited by examiner

CONTAMINATION RESISTANT REGENERABLE DESICCANT MEMBER COMPRISING A BENTONITE MATERIAL

RELATED APPLICATIONS

The present application is a national phase filing under 35 USC 371 of International Application No. PCT/US2018/41114 filed Jul. 6, 2018, which claims priority to U.S. Provisional Application No. 62/529,199 filed Jul. 6, 2017 and U.S. Provisional Application No. 62/544,407 filed Aug. 11, 2017, the entire contents and disclosures of which are hereby incorporated by reference.

TECHNICAL FIELD

Generally, the present disclosure relates to a desiccant member that is contamination resistant and regenerable. More specifically, this disclosure relates to a desiccant member comprising bentonite that is capable of adsorbing moisture from an atmosphere containing siloxanes, organic compounds having a boiling point greater than 60° C., or mixtures thereof.

BACKGROUND

Many items are susceptible to damage caused by excessive moisture. As used herein, the term "moisture" is intended to include water which is diffused or condensed, whether in liquid form or vapor form, from the ambient atmosphere. For instance, electrical and electronic items may be ruined or altered due to excessive moisture. Similarly, enclosed components, e.g., those contained in a housing, that undergo thermal cycling are susceptible to moisture related problems. Examples of enclosures which are susceptible to undesirable moisture include, for example, automotive headlamp units, solar inverters, electronics contained in enclosed housings, and other systems where on/off cycling of a heat source within an enclosure results in moisture build-up.

One means of removing moisture is to provide greater airflow across, or through, the enclosure. However, when components are located in an enclosed housing it can be difficult to provide adequate airflow, where more traditional approaches to moisture reduction such as increased vent opening size can exacerbate problems such as enclosure contamination.

Another means of managing moisture in an enclosure is to place a drying agent or desiccant within the enclosure. Silica gel is commercially used as a desiccant and it may be incorporated into a porous polymer matrix such as described in U.S. Pat. No. 4,830,643. However, silica gel has a limited capacity to adsorb moisture and requires "regenerating" or removal of adsorbed moisture to continue functioning as a means to remove moisture from the atmosphere of an enclosure.

Another means of managing moisture in an enclosure is by way of a moisture pump, in which air is transferred from an enclosed space to a silica gel desiccant in a heating chamber during an adsorption cycle, and the moisture is evaporated to an outside environment during a desorption cycle.

US20160363331 discloses systems including a moisture pump for removing moisture from an inside environment to an outside environment. The moisture pump includes a housing defining a heating chamber and a condensation chamber. Maintained by the housing is a desiccant, a heater, and a heat sink for selectively adsorbing water vapor in the heating chamber when the heater is off and desorbing water vapor into the heating chamber when the heater is on. A valve assembly is also maintained by the housing transitionable between an adsorption position and desorption position. The adsorption position allows water vapor to be selectively transmitted into the heating chamber from the inside environment. The desorption position allows water vapor to be transmitted from the heating chamber into the condensation chamber for transmission into the outside environment, respectively. Insulation is optionally used around the heating chamber to increase desiccant desorption efficiency.

WO1997027042 discloses a porous polymer material mixed with a drying agent that composes a desiccant which may be used proximate to a heat source or thermally cycling device, such as an automobile lamp. Heat generated by the heat source regenerates the drying agent in the porous polymer material. The desiccant material may be formed into a variety of shapes for ease of placing or affixing the material proximate to the heat source.

US 2007/0197711 discloses a polymer/organoclay composition having improved color stability. The composition includes a halogenated polymer matrix. It also includes an organoclay composition which is comprised of phyllosilicate clay and one or more quaternary ammonium compounds. The quaternary ammonium compounds include tri- and tetra-[poly]oxyalkylene quaternary ammonium compounds, the ether and ester derivatives thereof. The phyllosilicate clay includes a smectite clay and the polymer includes polyvinyl chloride. The polymer/organoclay composition includes quaternary ammonium compounds selected from the following: tris[2-hydroxyethyl]tallow alkyl ammonium ion, tris[2-hydroxyethyl]hydrogenated tallow alkyl ammonium ion and tris[2-hydroxyethyl]stearyl alkyl ammonium ion.

EP1818609 discloses a device that has a drying medium used for adsorbing air humidity from an internal air present in the device and for releasing the adsorbed air humidity to external air. An electric adjusting element is moved between adsorption and a desorption positions. A part of the drying medium is in contact with the internal air temporarily in the adsorption position for adsorbing humidity and is in contact with the external air temporarily in desorption position for releasing air humidity.

U.S. Pat. No. 6,290,758 discloses reducing the humidity in an equipment housing by providing a humidity pump which extracts humidity from the closed housing and vents it to the outside atmosphere. A tube passes through a wall of the housing and is open to the internal and external atmospheres. The tube contains a first portion of hygroscopic regenerative desiccant to adsorb moisture in the housing. Wicking material transfers the moisture to a second portion of regenerative desiccant. A heater drives off the moisture from the second portion creating a "moisture gradient" whereby moisture is continuously drawn off from the inside of the housing.

U.S. Pat. No. 6,235,219 discloses compositions useful as desiccants. The compositions may be prepared by admixing components comprising a hygroscopic material and an organic polymer in a solvent to form a solution, followed by drying the solution to remove solvent and provide a moisture-deficient hygroscopic material dispersed in the organic polymer. Alternatively, the compositions may be prepared by admixing components comprising a hygroscopic material and molten organic polymer to form a fluid admixture, followed by cooling the fluid admixture to a non-fluid state. The compositions of U.S. Pat. No. 6,235,219 may comprise:

(1) a hygroscopic material dispersed in polyvinyl alcohol; (2) a deliquescent material dispersed in an organic polymer; or (3) hygroscopic material and polymeric material both dissolved in solvent.

Contamination in such enclosures originates from both inside and outside the enclosures. For example, in computer hard drives, damage may result from external contaminates as well as from particles and vapors generated from internal sources.

U.S. Pat. No. 7,306,659 discloses a device for filtering contaminants, such as particulates and vapor phase contaminants, from a confined environment such as electronic or optical devices susceptible to contamination (e.g. computer disk drives) by improving filter performance and possibly incorporating multiple filtration functions into a unitary filter. The filter includes flow layers which improve filter performance. Filtration functions include a passive adsorbent assembly and can include a combination of inlet, or breather filter and adsorbent filter. Moreover, recirculation filter, diffusion tube and outside mount functions can be added to the filter depending on desired functionality within the enclosure.

U.S. Pat. No. 5,593,482 discloses an adsorbent assembly for removing gaseous contaminants from an enclosure having an adhesive layer, an adsorbent layer and a filtering layer. An exterior mounted assembly is also provided having an outer layer containing a metal or metallized material that provides an electromagnetic shield to the enclosure.

U.S. Pat. No. 5,500,038 discloses compact sorbent filter for selectively sorbing contaminants and a method of removing contamination from an enclosure with a filter is disclosed. The filter comprises a sorbent core including contaminant adsorbing material therein, an outer protective cover wrapped around the inner sorbent core so as to completely contain the sorbent core, with the exposed end(s) of the core being capped so as to encapsulate the sorbent core present within the filter while not limiting the amount of material contained therein. A sorbing filter is placed within an enclosure to remove gaseous contamination therein. The filter is particularly suitable for use in a computer disk drive or similar enclosure where out-gassing contamination may be a problem.

There continues to be a need for maintaining a working moisture capacity in a regenerable manner for many years and in humid environments, e.g., from 30 to 80% relative humidity.

SUMMARY

In general the present invention removes moisture from an atmosphere containing siloxanes, organic compounds having a boiling point greater than 60° C., or mixtures thereof. In one embodiment there is provided a desiccant member comprising a polymer material and a bentonite material, wherein the desiccant member is capable of maintaining a working moisture capacity in a regenerable manner while absorbing moisture from an atmosphere containing siloxanes, organic compounds having a boiling point greater than 60° C., or mixtures thereof. In a further embodiment, there is provided a desiccant member comprising a porous expanded polytetrafluoroethylene matrix filled with a bentonite material, wherein the desiccant member is capable of maintaining a working moisture capacity in a regenerable manner while absorbing moisture from an atmosphere containing siloxanes, organic compounds having a boiling point greater than 60° C., or mixtures thereof.

In another embodiment, there is an enclosure assembly comprising a housing comprising a first chamber having a heater, at least one adsorption port into the first chamber, and a bentonite material disposed proximate to the at least one adsorption port, and a valve assembly located within the housing and being transitionable between an adsorption position and a desorption position. The enclosure assembly may be referred to as a heated moisture pump. In one embodiment there is provided a desiccant member comprising the bentonite material. The bentonite material is regenerated to control the moisture in the internal atmosphere. The internal atmosphere contains siloxanes, organics having a boiling point greater than 60° C., or mixtures thereof is exposed to the bentonite material and the bentonite material is capable of maintaining a working moisture capacity.

In another embodiment, there is provided an enclosure assembly comprising a housing configured to retain an electronic device that thermally cycles; an inlet in the housing; and a protective vent inserted into the inlet of the housing, wherein the protective device comprises a rigid body having a port therein to allow airflow therethrough and a bentonite material adjacent to the port. The electronic device may be a solar inverter.

For passive moisture protection there is provided a protective vent comprising a rigid body having a port therein to allow airflow therethrough and a bentonite material adjacent to the port.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION

Figure 1:
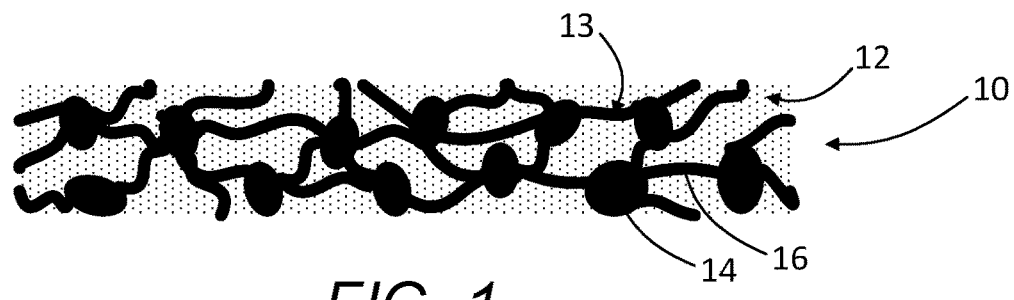
FIG. 1 is cross-sectional view of a desiccant member comprising a polymer matrix and bentonite material according to one embodiment.

In general the present invention provides a desiccant member comprising a bentonite material. In one embodiment, the desiccant member comprises a polymer material and a bentonite material. The desiccant members described herein are capable of adsorbing moisture from an atmosphere containing siloxanes, organic compounds having a boiling point greater than 60° C., or mixtures thereof. This allows the desiccant members to be used in demanding environments where there is contamination caused by internal sources as well as external sources. Off-gassing from internal components may build up in the internal atmosphere causing contaminants to be adsorbed by the desiccant member along with the moisture. Contamination from external sources, such as adjacent electronic equipment or from pollution, may also concentrate in the atmosphere from which the desiccant member is removing moisture. The present inventors have found that these contaminants have an adverse effect on some desiccant materials, in particular silica gel. A demanding environment often requires regenerating the desiccant member, but when regenerating the silica gel exposed to these contaminants, the working moisture capacity of the silica gel is deteriorated to a significant extent that the useable lifetime is reduced to a level that the silica gel must be replaced. To reduce the maintenance and improve the useable lifetime in demanding environments, the desiccant members described herein use a bentonite material that is capable of maintaining a working moisture capacity in a regenerable manner while absorbing moisture from an atmosphere containing siloxanes, organic compounds having a boiling point greater than 60° C., or mixtures thereof.

Although the desiccant members described herein can remove moisture from most atmospheres, the desiccant members comprising bentonite are particularly suited to remove moisture from an atmosphere that contains contaminants. In one embodiment, the contaminants comprise siloxanes, organic compounds having a boiling point greater than 60° C., or mixtures thereof. The atmosphere contains the contaminants in a quantity sufficient to be adsorbed by the desiccant member. The siloxanes concentration in the atmosphere may be at least 1 ppm or more, e.g., at least 5 ppm or more. Likewise, the total concentration of organic compounds in the atmosphere may be at least 1 ppm or more, e.g., at least 5 ppm or more. Various siloxanes may be present in the atmosphere including but not limited to hexamethylcyclotrisiloxane, octamethylcyclotetrasiloxane, decamethylcyclopentasiloxane, dodecamethylcyclohexasiloxane, tetradecamethylcycloheptasiloxane, hexamethyldisiloxane, octamethyltrisiloxane, decamethyltetrasiloxane, dodecamethylpentasiloxane or combinations thereof. The organic compounds having a boiling point greater than 60° C. may comprise aromatic or aliphatic alcohols. Examples of aromatic alcohols include benzyl alcohol, or 2,4-di-tert-butylphenol. Examples of aliphatic alcohols include 2-ethyl-hexanol, or dodecanol. In addition to alcohols several other organic compounds may also be present, such as, toluene, xylene, benzene, isopropyl benzene, trimethyl benzene, tetramethylbenzene, naphthalene, caprolactam, 1-hydroxycyclohexyl phenyl ketone, acetophenone, benzaldehyde, heptanal, hexanal, octahydro-4,7-methano-1H-indene, or tetradecane. It should be understood that other organics having a boiling point of greater than 60° C. may be present in the atmosphere.

When silica gel is exposed to this atmosphere it was found that several of these components were adsorbed into the silica gel in significant qualities of greater than 1 ppm. In particular, the total concentration of octamethylcyclotetrasiloxane, decamethylcyclopentasiloxane, dodecamethylcyclohexasiloxane, toluene, 2-ethyl-hexanol, benzyl alcohol, and caprolactam was found to be in significant quantities. Other organics were also found to be adsorbed into the silica gel. The presence of these compounds in the silica gel indicates that the atmosphere that is being managed for moisture has an undesired buildup of contaminants. Because it may be difficult to remove the contaminants from the atmosphere, the silica gel performs poorly and must be frequently replaced. As described herein, unlike silica gel, the bentonite material has unexpectedly and surprisingly been found be resistant to these contaminants and can maintain a working moisture capacity in a regenerable manner.

Bentonite is a naturally occurring phyllosilicate clay and comprise minerals from the smectite family. Bentonite is commercially available as sodium bentonite, calcium bentonite or mixtures thereof. The bentonite material comprises one or more phyllosilicates, including, but not limited, to montmorillonite, saponite, beidellite, and/or hectorite. The amount of phyllosilicates varies by the source of bentonite. In addition to phyllosilicates, bentonite also comprises, quartz (crystalline silica), glass particles and soluble salts. In one exemplary embodiment, the bentonite material comprises from 70 to 99% montmorillonite, e.g., from 75 to 97% montmorillonite, from 75 to 95% montmorillonite, or from 75 to 90% montmorillonite.

To avoid the problems associated with silica gel, the bentonite material used herein is substantially free of silica gel and preferably contains no effective amount of silica gel for adsorbing moisture. In comparing bentonite to fresh silica gel, unexposed to moisture, the unexposed silica gel has a moisture capacity that is greater than unexposed bentonite on an equal weight basis in a clean environment not having contamination. Because of this difference in unexposed moisture capacity, silica gel has been the main commercial desiccant. Silica gel relies on surface area to hold moisture and suffers from surface area loss after desorb/adsorb cycles. Unlike silica gel, bentonite adsorbs moisture by swelling. Although bentonite exhibits comparable surface area losses, the present inventors have surprisingly and unexpectedly found that bentonite maintains a higher working moisture capacity than silica gel even in the presence of contamination. This provides the embodiments of the present invention with a contamination resistant desiccant member.

It was unexpectedly and surprisingly found by the present inventors that a bentonite material in a desiccant member in a contaminated atmosphere exhibits very little long-term impact to working moisture capacity. This provides the desiccant members of the present invention a working moisture capacity that is greater than silica gel, especially when exposed to an atmosphere containing siloxanes, organic compounds having a boiling point greater than 60° C., or mixtures thereof. Working moisture capacity refers to the equilibrium obtained after successive regenerating cycles where the change between each cycle is small or zero. Maintaining the working moisture capacity allows the desiccant members as described herein to be used in demanding environments for longer periods of time such as for 1, 5, 10, 15, 20 or even 25 years. This is particularly beneficial at a relative humidity of 30% or more, 35% or more, 40% or more, 50% or more, 55% or more, and 80% or less, 75% or less, 70% or less, 65% or less, or 60% or less, e.g., from 30 to 80% relative humidity. Silica gel can experience a working moisture capacity loss of up to 90% of the initial moisture capacity. This requires more maintenance and increased replacement expense for silica gel.

The various embodiments described herein maintain the working moisture capacity and this demonstrates an improvement over other materials. In particular, the moisture capacity of the bentonite material is substantially retained after being regenerated. The working moisture is maintained over long cycle times to provide a durable desiccant member. In one exemplary embodiment, for short periods of time the working moisture capacity may be greater than 25% of the initial moisture capacity at 11.5 g/m$^3$ water vapor concentration at 25 degrees C. (50% relative humidity) and 67 regeneration cycles. In another embodiment, the working moisture capacity may be greater than 50% of the initial moisture capacity at 11.5 g/m$^3$ water vapor concentration at 25 degrees C. and 67 regeneration cycles. In another embodiment, the working moisture capacity may be greater than 70% of the initial moisture capacity at 11.5 g/m$^3$ water vapor concentration at 25 degrees C. and 67 regeneration cycles.

After longer periods of regeneration, in exemplary embodiments, the working moisture capacity may be greater than 10% of the initial moisture capacity at 11.5 g/m$^3$ water vapor concentration at 25 degrees C. (50% relative humidity) and 536 regeneration cycles, e.g., greater than 15% of the initial moisture capacity at 11.5 g/m$^3$ water vapor concentration at 25 degrees C. and 536 regeneration cycles, greater than 20% of the initial moisture capacity at 11.5 g/m$^3$ water vapor concentration at 25 degrees C. and 536 regeneration cycles, greater than 25% of the initial moisture capacity at 11.5 g/m$^3$ water vapor concentration at 25 degrees C. and 536 regeneration cycles, or greater than 40% of the initial moisture capacity at 11.5 g/m$^3$ water vapor concentration at 25 degrees C. and 536 regeneration cycles. In most applications, 536 cycles is about a year of operating time.

Figure 17:
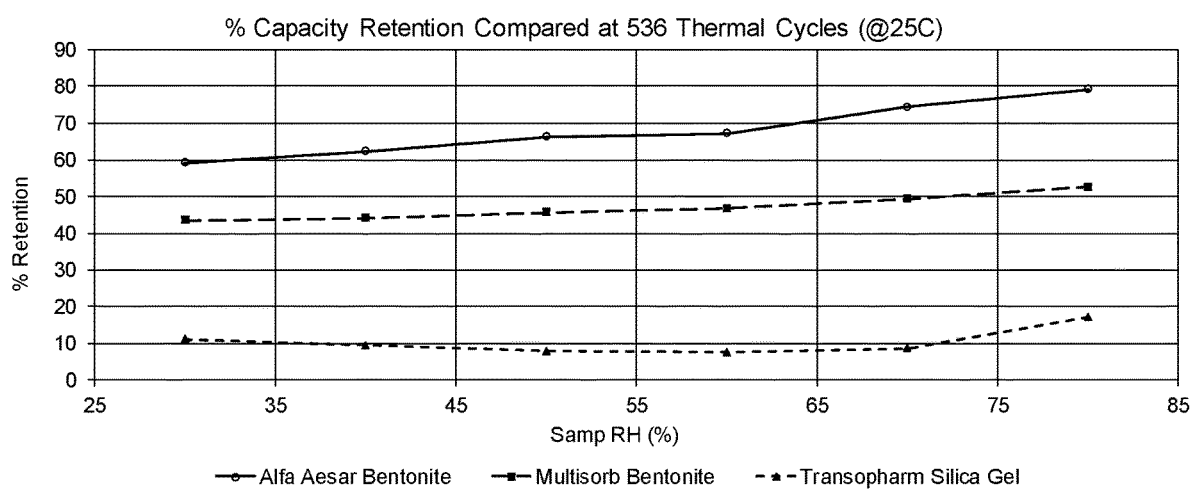
Figure 23:
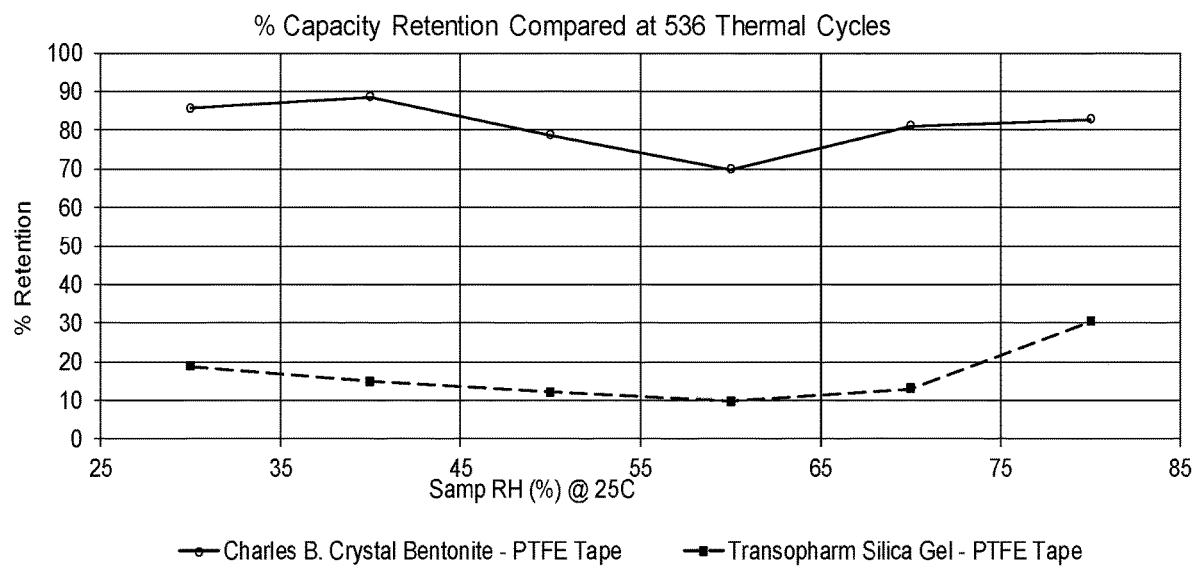
Figure 33:
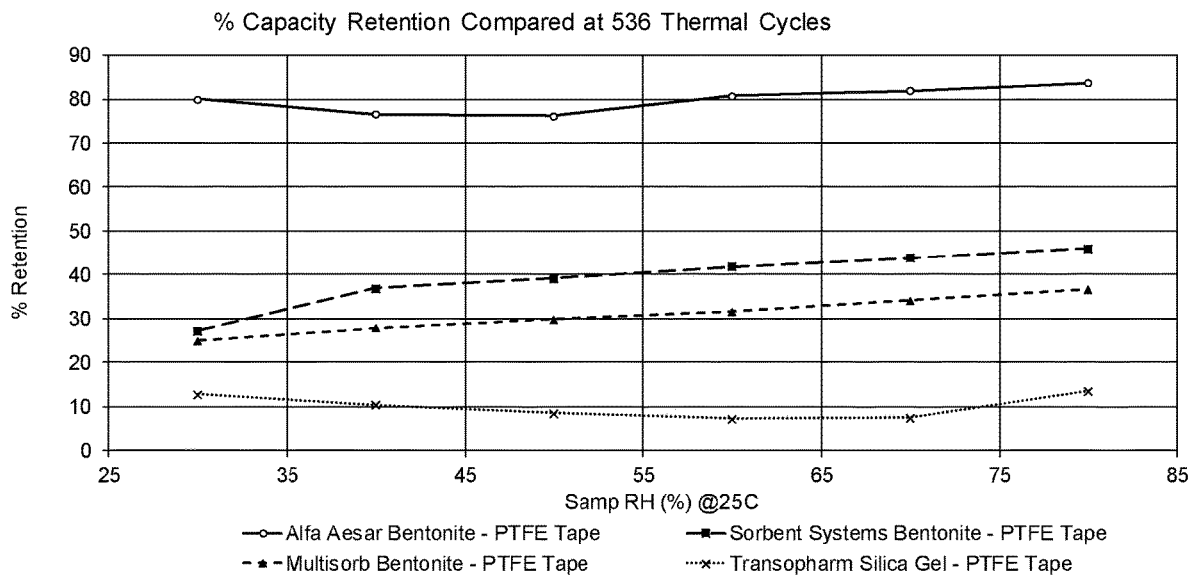

In one embodiment, the working moisture capacity may be maintained above 20% of the initial moisture capacity across a range of relative humidity from 30 to 80% at 536 regeneration cycles. Silica gel cannot maintain the working moisture capacity, especially in the presence of the contaminants as shown in FIGS. 17, 23 and 33 as described further below with the examples. Larger volumes of silica gel are required to improve its working moisture capacity, but these volumes are so large that it may unsuitable for most applications, especially for smaller enclosure assemblies.

In addition to improved working moisture capacity, in terms of absolute values the bentonite material exhibits improved moisture capacity retention after being regenerated a number of cycles. The cycling period may vary depending on the electronic device and service, but the capacity to retain moisture longer allows the desiccant to be used in demanding environments and reduces the maintenance costs. In one embodiment, the moisture capacity of the bentonite material is substantially retained after being regenerated. Generally, the bentonite material has a reduced moisture capacity change. At a 50% relative humidity at 25° C. (11.5 g/m$^3$ water vapor concentration), in one exemplary embodiment, the desiccant member comprising bentonite has a moisture capacity change at no more than 75% at 67 cycles, e.g., no more than 60% at 67 cycles, no more than 50% at 67 cycles, no more than 40% at 67 cycles, no more than 35% at 67 cycles, or no more than 30% at 67 cycles. For short term uses, such as 67 cycles when the moisture capacity change is greater than 75%, then the initial loss the desiccant suffers is too large to be used in demanding environments. For longer term uses, at a 50% relative humidity at 25° C. (11.5 g/m$^3$ water vapor concentration), in one exemplary embodiment, the desiccant member comprising bentonite has a moisture capacity change at no more than 90% at 536 cycles, e.g., no more than 80% at 536 cycles, no more than 70% at 536 cycles, no more than 60% at 536 cycles, no more than 55% at 536 cycles or no more than 50% at 536 cycles.

In one embodiment, the desiccant member comprises a polymer material. Based on the total weight of the desiccant member, the loading of the bentonite material in the porous polymer matrix ranges from 50 to 99%, e.g., from 50 to 80%, or from 50 to 75%. Loadings of less than 50% typically do not employ enough bentonite for moisture control and requires increased thickness of the member.

The desiccant member may have a thickness from 0.1 to 15 mm. In another embodiment, the desiccant member may have a thickness from 0.1 to 3 mm. In some embodiments, the desiccant member comprises a bentonite material and a polymer material and may have a thickness from 0.8 to 2.5 mm. In some embodiments, the desiccant member comprising the bentonite and polymer materials may have a thickness from 0.85 to 2.15 mm. A small thickness allows the desiccant member to be employed in several applications that have small venting ports. Although in some embodiments the thickness may be increased to provide larger capacity for low loadings of the bentonite material. The thickness of the desiccant member may be substantially uniform in thickness throughout the area of the desiccant member. In certain embodiments, a desiccant member may have a thickness variation of less than 0.5 mm, or in some cases less than 0.25 mm.

The desiccant member herein described may be flexible, which provides for several advantages. A flexible desiccant member allows for conformability to heat spreader or heat, as well as the venting port or other associate components described herein. Increasing conformability may enhance heat transfer when regenerating the desiccant member. The flexible desiccant member form can withstand flexing, such that the desiccant member can be manufactured as a flat surface and installed by flexing the desiccant member to emplace within the housing or port. In certain embodiments, flexible desiccant members may be capable of conforming to a curvature with a radius of less than three millimeters, e.g., less than one millimeter, or less than 0.5 millimeter, without producing particulates. Flex durability can be measured in a simple mandrel roll test where the flexible members form is rolled onto a mandrel in both X and Y directions at a small radius without visible surface cracking or particle generation.

The desiccant member may be configured into a variety of three dimensional shapes, including fibers, sheets, tubes, tapes, pellets, or beads.

Figure 2:
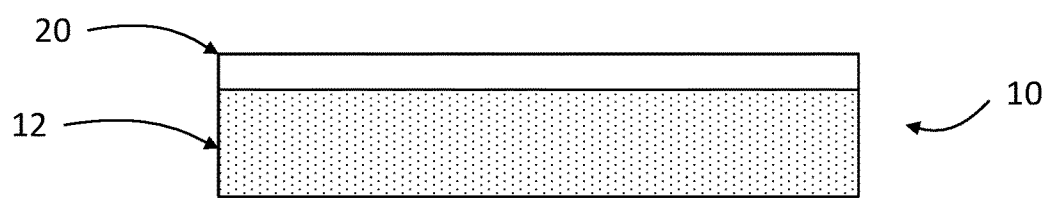
FIG. 2 is cross-sectional view of a desiccant member comprising a film of polymer material adjacent to a bentonite material according to one embodiment.
Figure 3:
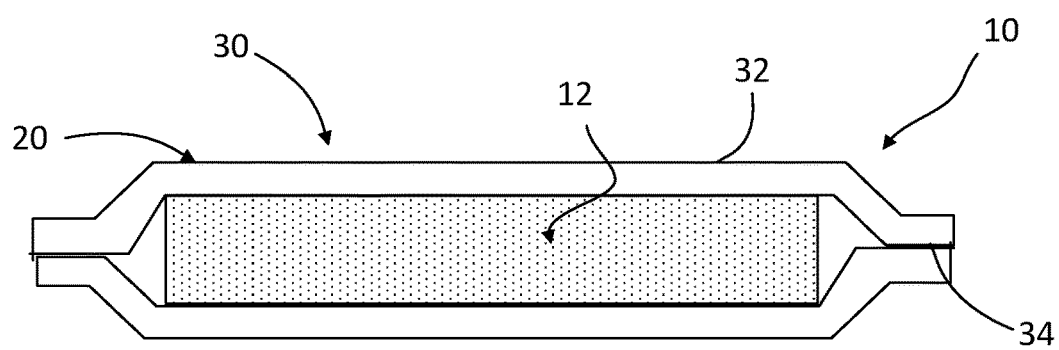
FIG. 3 is cross-sectional view of a desiccant member comprising a pouch of polymer material adjacent to a bentonite material according to one embodiment.
Figure 4:
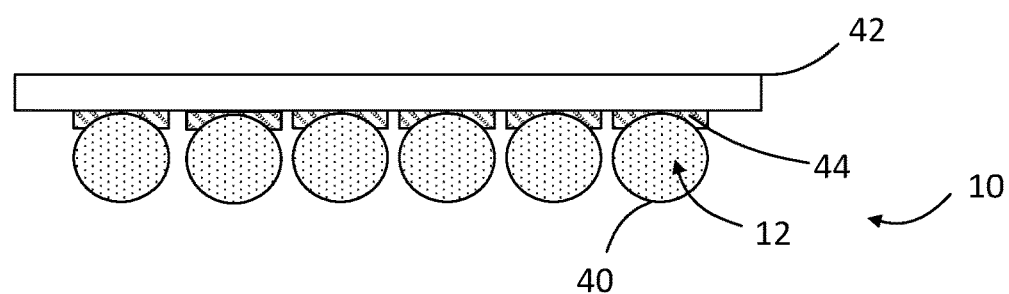
FIG. 4 is cross-sectional view of a desiccant member comprising a film of polymer material having discrete beads of bentonite material adhered thereto according to one embodiment.

The structure of the desiccant member 10 can be adapted based on the application. The desiccant member 10 has a structure that allows the bentonite material to be regenerable. Various cross-sectional views of desiccant members 10 are shown in FIGS. 1-4. In one embodiment, as shown in FIG. 1, the bentonite material 12 may be incorporated within a matrix 13 of the polymer material to form the desiccant member 10. The polymer material may form a matrix 13 that is an interconnected network having voids. In one embodiment, the interconnected network may comprise a plurality of nodes 14 connected by one or more fibrils 16. In other embodiments, the interconnected network may comprise fibrils that are joined to create voids. The matrix 13 has void area that is filled or impregnated, either completely or partially, by bentonite material 12. In one embodiment, the bentonite material 12 can form an interconnected network where bentonite material 12 from one void area contacts bentonite material in adjacent void areas. Embedding or impregnating the matrix 13 reduces the escape of bentonite dust or debris from the matrix. In one embodiment, the matrix 13 is a porous polymer matrix in the form of a sheet, tube, or tape, and the porous polymer matrix comprises PTFE. In another embodiment, as shown in FIGS. 2 and 3, the polymer material may be a film 20 that is adjacent to the bentonite material 12 to form the desiccant member 10. The film 20 may be a layer that is adjacent to at least one surface of the bentonite material 12 as shown in FIG. 2 or the film 20 may be a pouch 30 shown in FIG. 3 that surrounds the bentonite material 12. It should be understood that in some embodiments the film 20 may be adjacent to multiple surfaces of the bentonite material 12. A pouch 30 may have film sheets 32 of polymer material that are sealed or joined along an edge 34 to provide an enclosure for the bentonite material 12. The bentonite material may be individual loose particles or may be compressed into a tablet. A sealed pouch 30 may also be useful to contain any dusting caused by the bentonite material 12. In a further embodiment, as shown in FIG. 4, there may be one or more beads 40 of the bentonite material 12 that are adhered to polymer material 42, such as a film or matrix. The beads 40 may be discrete and may be fused to the polymer material 42 or may be adhered with an adhesive layer 44. It should be understood by those skilled in the art that the bentonite material may be incorporated in the desiccant member using one or more of these techniques.

Various polymer materials may be used including porous and non-porous polymers. To allow desorption from the bentonite material the polymer material may be permeable to water vapor, but may be liquid impermeable. This allows the desiccant member to be used in environments that use venting to regulate internal pressure. Thermally stable polymer materials are preferred and the melting point of the polymer material should be above the regeneration temperature of the bentonite. When the melting point is lower than the regeneration temperature the polymer material may deform or loss its shape during regeneration and this may cause loss of moisture capacity or dusting of the bentonite material. Suitable polymers materials may include polyolefins, polyurethanes, or fluoropolymers. The fluoropolymers may include polychloroprene, polyvinyl chloride (PVC), polyvinylidene chloride (PVDC), vinylidene chloride-vinyl chloride copolymers, vinyl chloride copolymers, vinylidene fluoride polymers, polyvinylidene fluoride (PVDF) or polytetrafluoroethylene (PTFE). Expanded polymers, such as expanded PTFE (ePTFE), expanded polyethylene or expanded polypropylene (biaxially oriented polypropylene), may be used to create a porous polymer matrix.

Although polymer materials are used in one embodiment, in other embodiments, the bentonite material may be retained using a metal screen of mesh, retained using a textile material that is woven, non-woven or knitted, or retained using a suitable binder such as a diatomic clay. Thus, in one embodiment, there is provided a desiccant member comprising at least one metal screen, metal mesh, textile, or diatomic clay, and a bentonite material, wherein the desiccant member is capable of adsorbing moisture from an atmosphere containing siloxanes, organic compounds having a boiling point greater than 60° C., or mixtures thereof.

In one embodiment, the desiccant member comprises an ePTFE matrix filled with a bentonite material. This desiccant member is capable of adsorbing moisture from an atmosphere containing siloxanes, organic compounds having a boiling point greater than 60° C., or mixtures thereof. In addition, ePTFE is thermally stable at the regeneration temperature of the bentonite material.

The desiccant members described herein may be used in several different applications that require moisture control including passive and active systems. In general there may be a protective vent comprising a rigid body having a port therein to allow airflow therethrough and a bentonite material adjacent to the port. Protective vents are useful for keeping liquid and particulates from entering the enclosure, while at the same time allowing air to pass through. Allowing air to pass through may reduce stress on the seals of the enclosure and equalize the pressure within the casing or enclosure. Incorporating a bentonite material into the protective vent further improves the moisture management, especially if the internal atmosphere comprises contaminants, such as siloxanes and organics.

In one embodiment, there is provided a casing configured to retain an electronic device that thermally cycles, an inlet in the casing, a protective vent inserted into the inlet of the housing, wherein the protective vent comprises a rigid body having a port therein to allow airflow therethrough and comprising a bentonite material adjacent to the port. A polymer material such as matrix or film may also be used to restrain the bentonite material. The protective vents may be screwed or snapped into the inlet of the casing.

Figure 5:
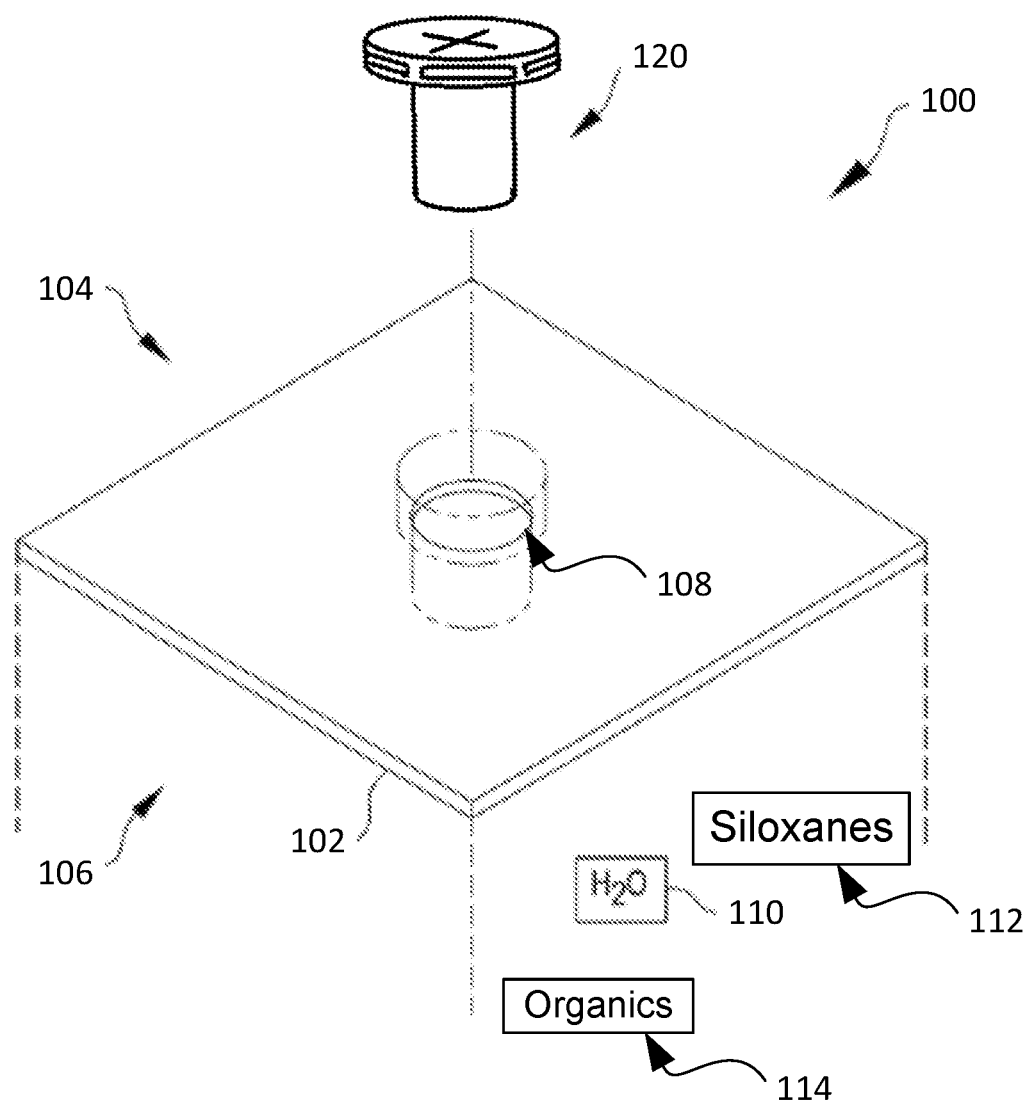
FIG. 5 is a perspective view of a protective vent in a casing for an electronic component according to one embodiment.

FIG. 5 is a perspective view of an enclosure assembly 100 including an casing 102 defining an enclosure and separating an outside environment 104 from an inside atmosphere 106. In one embodiment, the casing forms at least one of an air-tight, a moisture-tight, and a water-tight seal so that the only air passage between the outside environment 104 and the inside atmosphere 106 is through inlet 108. As used herein, "outside" and "inside" are terms used to describe spaces relative to the casing 102, which are, for example, on opposite sides of the casing. As shown in FIG. 5, a protective vent 120 is inserted in an inlet 108. Airflow can pass through the protective vent 120 and this can equalize the pressure within the casing 102. Protective vent 120 may have a rigid body and port. In one embodiment, protective vent 120 comprises a bentonite material and in a further embodiment comprises a desiccant member comprising a polymer material and a bentonite material. Although not shown in FIG. 5, the casing may comprise an electronic device, such as a solar inverter, that thermally cycles. For automobile applications this can include a light bulb for a headlamp. The thermal cycling causes moisture 110 to buildup in the inside atmosphere 106. The presence of moisture 110 can reduce the useful lifecycle of the heating source or other components, especially electric or electronic components within the casing. In addition, due to off-gassing or external contamination, the inside atmosphere 106 may also comprise siloxanes 112 or organics 114 having a boiling point above 60° C. As described herein it is unexpected and surprising that a protective vent comprising a bentonite material is able to maintain a working moisture capacity useful for moisture management when exposed to such an atmosphere.

One type of protective vent is a heated moisture pump. As described in further detail the bentonite material is particularly suitable for a heated moisture pump.

In one embodiment of a heated moisture pump, there is provided an enclosure assembly comprising a housing and a valve assembly located within the housing and being transitionable between an adsorption position and a desorption position. The housing further comprises a first chamber having a heater, at least one adsorption port into the first chamber, and a bentonite material disposed proximate to the at least one adsorption port. In one embodiment, the bentonite material may be in a desiccant member as described herein. The housing further comprises a condensation chamber, and a venting port out of the condensation chamber. The adsorption position seals a desorption port between the heating chamber and the condensation chamber and opens the adsorption port into the heating chamber for water vapor transmission into the heating chamber. The desorption position seals the adsorption port and opens the desorption port between the heating chamber and the condensation chamber for water vapor transmission out of the heating chamber. This device may be referred to as a heat pump or moisture pump. Various details of the heated moisture pump will now be described in the following embodiments.

Figure 6:
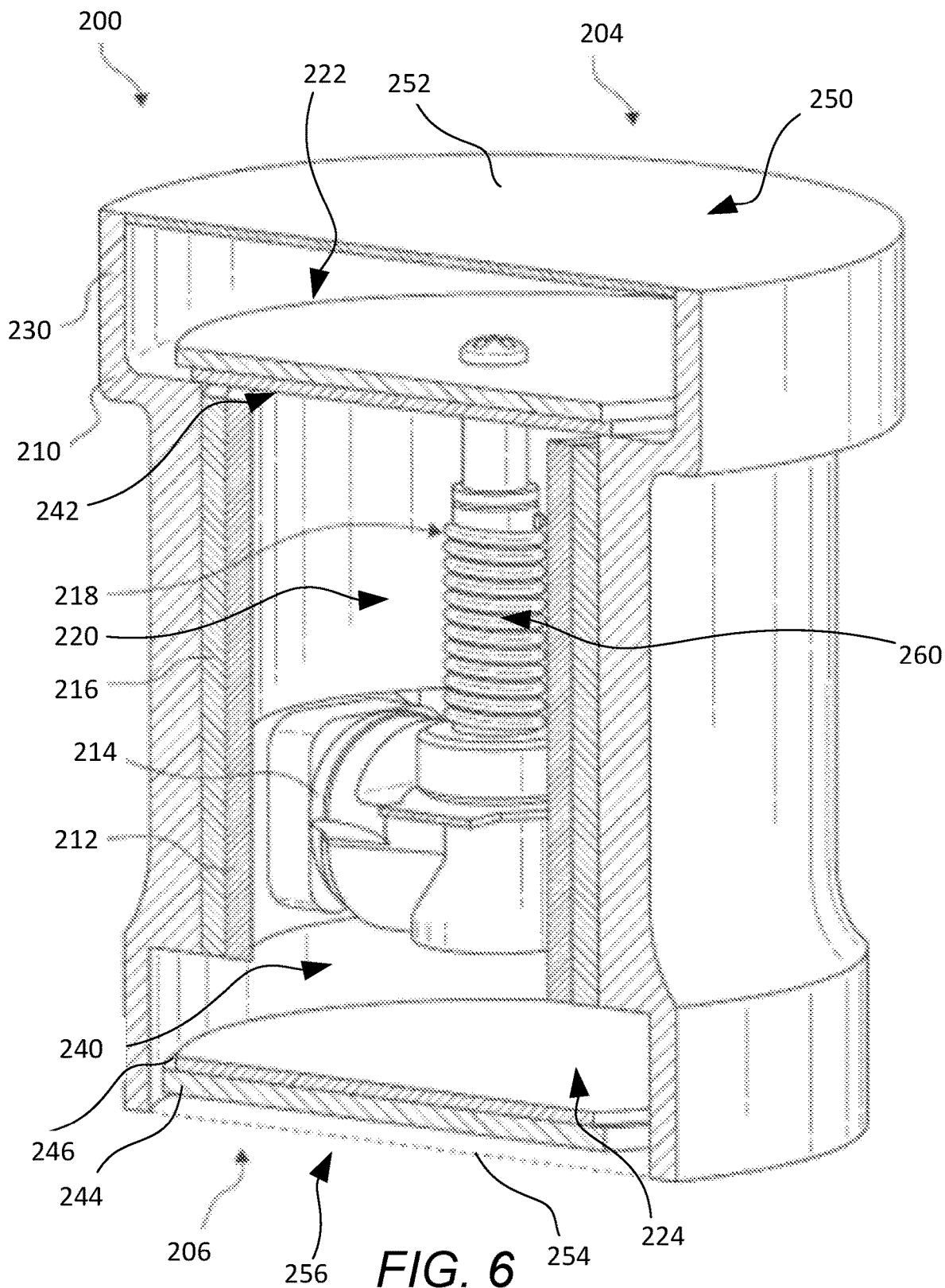
FIG. 6 is a perspective view of a moisture pump in a desorbing configuration according to one embodiment.
Figure 7:
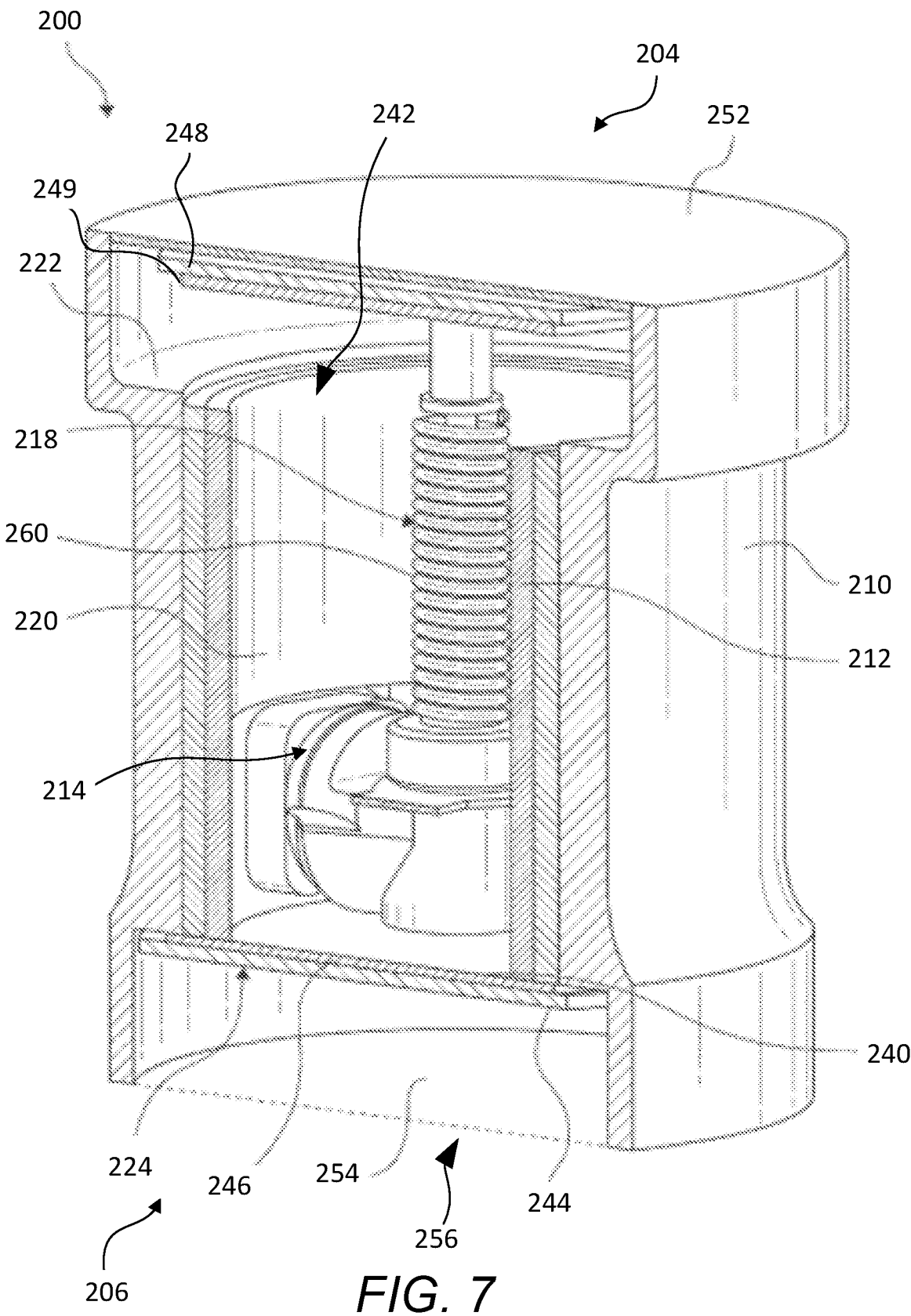
FIG. 7 is a perspective view of a moisture pump in an adsorbing configuration according to one embodiment.

In one embodiment, as shown in FIGS. 6 & 7, there is a cutaway perspective view of the moisture pump 200 having a pump housing 210 (shown in partial cutaway), a bentonite material 212 (shown in partial cutaway), a heater 214, a heat spreader 216 (shown in partial cutaway) that may function as a heat sink, and a valve assembly 218 (shown in partial cutaway) that is transitionable to selectively allow water vapor transmission into and out of one or more chambers 220, 222, 224 defined by the pump housing 210. In one embodiment, there is a desiccant member comprising the bentonite material 212. The moisture pump 200 generally operates to remove moisture from the inside atmosphere 206 that enters the moisture pump 200 and return the moisture to the outside environment 204 by exiting the moisture pump 200. The bentonite material 212 is configured to adsorb water vapor from the air, generally, when not heated. As shown in FIG. 6, the moisture pump 200 is an adsorbing position. FIG. 7 shows a moisture pump in a desorbing position. As shown, the moisture pump 200 has a rotationally symmetrical shape with cylindrical parts, although a variety of shapes are contemplated.

A non-limiting example of a heater 214 is a positive thermal coefficient (PTC) heater and this may be self-regulating. Heater 214 may be powered by AC or DC current. In many applications, DC current is readily available as the source for the heater 214. Heater 214 can be selected to draw on the available voltages in the application. Selecting a heater to work with available voltages can decrease overall system costs. In certain embodiments, for a broad array applications, including but not limited to automobiles, computer systems, lighting, and electronic enclosures, the DC voltages may be from 2V to 80V, e.g., from 2V to 24V or from 10V to 16V.

When inserted in the inlet of a casing, the pump housing 210 forms at least one of an air-tight, a moisture-tight, and a water-tight seal with the casing. The pump housing 210 may formed of a single piece of rigid material, although separate, connected parts are contemplated. The moisture pump 200 directs moisture from the inside atmosphere 206 into one or more chambers inside the pump housing 210 and directs moisture from the one or more chambers to the outside environment 204. In this manner, the moisture pump 200 facilitates the removal of moisture from the inside atmosphere 206 to extend the useful lifecycle of the electronic components within the casing.

The pump housing 210 defines a heating chamber 220, a condensation chamber 222 adjacent to the heating chamber 220. In further embodiments, pump housing 210 may also define a debris chamber 224 adjacent to the heating chamber 220. In operation, water vapor is selectively transmitted into the heating chamber 220 (e.g., through the debris chamber 224) from the internal atmosphere 206 and, in turn, from the heating chamber 220 to the condensation chamber 222 to be expelled into the external environment 204.

As shown, the pump housing 210 includes a wall 230 forming at least a lateral boundary of the heating chamber 220, condensation chamber 222, and debris chambers 224. At the condensation chamber 222, the inner surface of the wall 230 defines a condensation surface that optionally serves as a place for water vapor to collect or precipitate as a liquid, which reduces moisture in the air of the condensation chamber 222.

Also as shown in FIGS. 6 & 7, the pump housing 210 also has an adsorption port 240, a desorption port 242, and a venting port 244. The adsorption port 240 provides an area for water vapor transmission into the heating chamber 220 and the desorption port 242 provides an area for water vapor transmission out of the heating chamber 220 into the condensation chamber 222. As shown, the desorption port 242 is positioned between the heating chamber 220 and the condensation chamber 222 and generally corresponds to the area where the pump housing 210 necks down in diameter, although a variety of configurations are contemplated. As will be described in greater detail, the chambers 220, 222, 224 are typically either selectively or continuously separated by valve and/or filter (e.g., membrane) structures.

The heater 214 directs heat to the heat spreader 216 for heating the desiccant 212. In operation, the heater 214 is selectively powered to generate heat. Though a portion of the heat may be dissipated through the air (e.g., via convection) or other components, generally a significant portion of generated heat is adsorbed into the heat spreader 216. At least a portion of the heat in the heat spreader 216 is adsorbed (e.g., via conduction) into the bentonite material 212. Water vapor adsorbed in the bentonite material 212 is heated and released from the bentonite material 212 into air in the heating chamber 220, for example. When the heater 214 is not powered, and the bentonite material 212 is sufficiently cooled, the bentonite material 212 adsorbs water vapor from the air.

The valve assembly 218 includes an actuator 260 configured to transition the valve assembly 218 relative to the housing 210 between a first position and a second position. In one embodiment, when the heater 214 delivers heat to the heating chamber 220, the actuator 260 and the bentonite material 212 are heated through heat spreader 216. In response, the actuator 260 expands, and the bentonite material 212 desorbs moisture to the heating chamber 220. When the heater 214 does not deliver heat to the heating chamber 220, actuator 260 and the bentonite material 212 cool down. In response, the actuator 260 contracts, and the bentonite material 212 adsorbs water vapor from the air of the heating chamber 220. In other embodiments, the actuator may be a thermomechanical actuator responsive to temperature, such as a phase change material. Non-limiting examples of phase change materials include wax (e.g., paraffin wax), bimetal elements, and Nitinol.

Various embodiments of the moisture pump 200 include one or more membranes. Membrane 252 covering the vent port 250 prevents solid debris from entering or leaving the moisture pump 200, such as preventing particles freed from or dusted off the bentonite material 212 from leaving the pump housing 210 and entering the outside environment 204. Membrane 252 also prevents particles (e.g., dust) from entering from the outside environment 204. An optional membrane 254 may be used to cover the inlet port to prevent particles freed from or dusted off the bentonite material 212 from leaving the pump housing 210 and entering the inside atmosphere 206.

Another purpose of the one or more membranes 252, 254 is to allow air and water vapor to be transmitted therethrough. Yet another purpose of the one or more membranes 252, 254 is to prevent liquid water from being transmitted therethrough. Still another purpose of the one or more membranes is to discourage oils from building up on the membrane. In some embodiments, the one or more membranes are solid debris impermeable, air permeable, vapor permeable (e.g., water vapor permeable), water impermeable, and oleophobic in response to the one or more purposes selected. As illustrated, membrane 252 covers the venting port 250. Also, as illustrated, the optional membrane 254 covers the intake port 256 and is positioned between the pump housing 210 and an inside atmosphere 206 to prevent particles freed from the bentonite material 212 from entering the inside environment 206. In some embodiments, the membrane 250 is adhered to the pump housing 210. Examples of suitable membrane materials include ePTFE membranes, such as those described in U.S. Pat. Nos. 6,210,014, 6,709,493, and 8,968,063, the contents of which are incorporated herein by reference for all purposes.

In the desorption position shown in FIG. 7, the actuator 260 is expanded, or in an extended position. In transitioning to the desorption position, the valve assembly 218 seals the adsorption port 240 and opens the desorption port 242. In particular, the adsorption port cover 244 including a gasket 246 contacts the pump housing 210 to seal the adsorption port 240. During and/or for a desired period of time following a heating cycle, the valve assembly 218 is in the desorption position and heat is delivered to the heating chamber 220, particularly to the actuator 260 and the bentonite material 212. In response to the heat delivered by the heater 214, the actuator 260 expands and the bentonite material 212 begins to release moisture into the air. As shown, in either the desorption or adsorption positions the heater 214 remains in a fixed position relative to the pump housing 210 outside of the condensation chamber 222 of the pump housing 210.

Water vapor is free to be transmitted from the heating chamber 220 into the condensation chamber 210, for example, by diffusion. However, according to the operation illustrated in FIGS. 6 and 7, water vapor generally cannot be transmitted into the debris chamber 224 or internal atmosphere 206 due to the seal of the adsorption port cover 244 when the moisture pump 200 is in the desorption position. Accordingly, water vapor from the heating chamber 220 also generally cannot be transmitted out of the optional membrane 254. Heated water vapor in the condensation chamber 222 vents through membrane 252 or begins to condense on one or more surfaces in the condensation chamber 222.

In one embodiment, the moisture pump 200 having the condensation chamber 222 increases the moisture desorption from the bentonite material 212. This may allow the bentonite material 212 to remove more moisture.

Various embodiments of the disclosure facilitate appropriate timing between the valve assembly positions and the heating of the bentonite material 212 to eject moisture. Non-limiting examples of configurations, presented in the alternative or in combination, that facilitate appropriate timing include: setting the wax melting temperature of the actuator 260 lower than the desorption temperature of the bentonite material 212, locating the heater 214 closer to the actuator 260 and relatively further from the bentonite material 212 on the heat spreader 216, setting the cross sectional area of the heat spreader 216 to favor more transient heat flux to the actuator 260 than to the bentonite material 212, and selecting material properties of the heat spreader 212 to favor a high heat transfer rate to the actuator 260 before the bentonite material 212. Additionally, in some embodiments a microcontroller is optionally utilized to directly control heater temperature and duration and/or operation of an electronic (e.g., solenoid) rather than phase change actuator (not shown).

In some instances, after a selected amount of time, heat is no longer delivered to the heating chamber 220, and the valve assembly 218 seals the desorption port 240 to begin an evaporation cycle. The liquid water in the condensation chamber 222 is free to continue evaporation and water vapor remaining in the condensation chamber 222 is free to continue transmission out of the condensation chamber over a period of time while the moisture pump 200 remains in the adsorption position. Due to the seal of the desorption port 242 by desorption port cover 248, this moisture generally cannot re-enter the heating chamber 220 from condensation chamber 222. Desorption port cover 248 also has a gasket material 249 for sealing the desorption port 242 when in the adsorption position. Although not shown adsorption port cover 244 and desorption port cover 248 may be linked by one or more connectors so the covers move with the movement of the actuator 260. The bentonite material 212 is free to begin adsorbing moisture entering the heating chamber 220 through adsorption port 240. A person having skill in the art and the benefit of this disclosure would be able to select an appropriate time for heating, desorption, and adsorption in view of a particular application and moisture pump characteristics.

As shown in FIGS. 6 and 7 the valve area of adsorption port and desorption port is approximately equal. In one embodiment, it may be advantageous to use a heated moisture pump where the valve area of the absorption port is greater than that of the desorption port thus creating a valve area differential. This differential can advantageously increase the rate for capturing moisture without resorting to increasing the size. In one embodiment, the adsorption port and desorption port each respectively define an adsorption area and a desorption area, and the adsorption area is larger than the desorption area to provide a differential valve area. The adsorption port(s) comprises a plurality of openings in the housing arrayed in a parallel set, each opening being arranged perpendicular to a direction of travel of the valve assembly. Thus, the adsorption port comprises a plurality of openings in the housing to define an adsorption area. Each opening has a width in the direction of travel of the valve assembly that is approximately equal to a width of the desorption port. The valve assembly comprises a valve assembly having a plurality of openings therein that are arranged to align with the adsorption port openings when the valve assembly is in the adsorption position, and a plurality of blocking regions disposed between the openings that are arranged to align with and block the adsorption port openings when the valve assembly is in the desorption position. The desorption port has a width approximately equal to the width of each opening of the plurality of adsorption openings. The width of each opening of the plurality of adsorption openings is preferably less than or equal to the corresponding width of a respective blocking region of the valve assembly.

The adsorption port can comprise at least one opening in a wall of the housing that is proximate to and substantially parallel to the bentonite material or desiccant member. For example, the housing can contain a void therein and the opening(s) can be positioned parallel to a surface of the bentonite material or desiccant member and across the void from the bentonite material or desiccant member. Where the housing is a cylindrical barrel, the desiccant can be substantially cylindrical also and positioned inside the housing and separated from the housing by a void. In some embodiments, the wall of the housing at least partially surrounds the bentonite material or desiccant member and is removed by a distance, i.e. a distance that permits airflow between the wall of the housing and the bentonite material or desiccant member. In some embodiments, the valve assembly includes a valve assembly interior to the housing and slidingly mounted within the housing, the valve assembly being operable to cover the desorption port in the adsorption position, and operable to cover the at least one adsorption port in the desorption position.

For the embodiments with a differential valve area there may also be a second chamber, referred to as a condensation chamber, defined between a desorption port and a venting port. The venting port may have a membrane covering the venting port.

The membrane can be water vapor permeable and liquid water impermeable. The valve assembly can be transitionable between an adsorption position in which the valve assembly seals the desorption port between the heating chamber and the condensation chamber with the desorption port cover and opens the adsorption port into the heating chamber for water vapor transmission into the heating chamber, and a desorption position in which the valve assembly seals the adsorption port with the adsorption port cover and opens the desorption port between the heating chamber and the condensation chamber for water vapor transmission out of the heating chamber.

Figure 8:
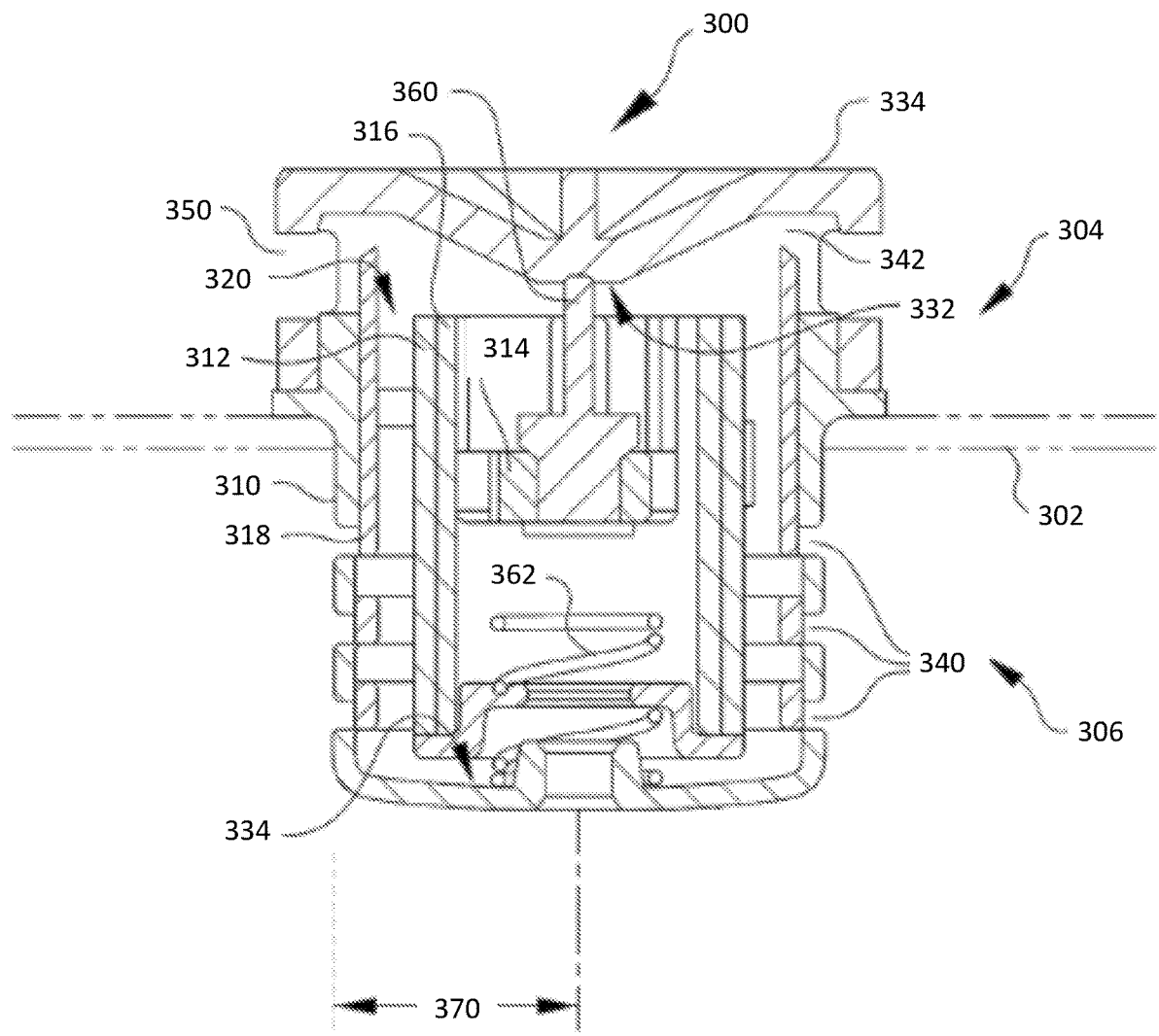
FIG. 8 is a perspective view of a moisture pump having a differential valve in a desorbing configuration according to one embodiment.
Figure 9:
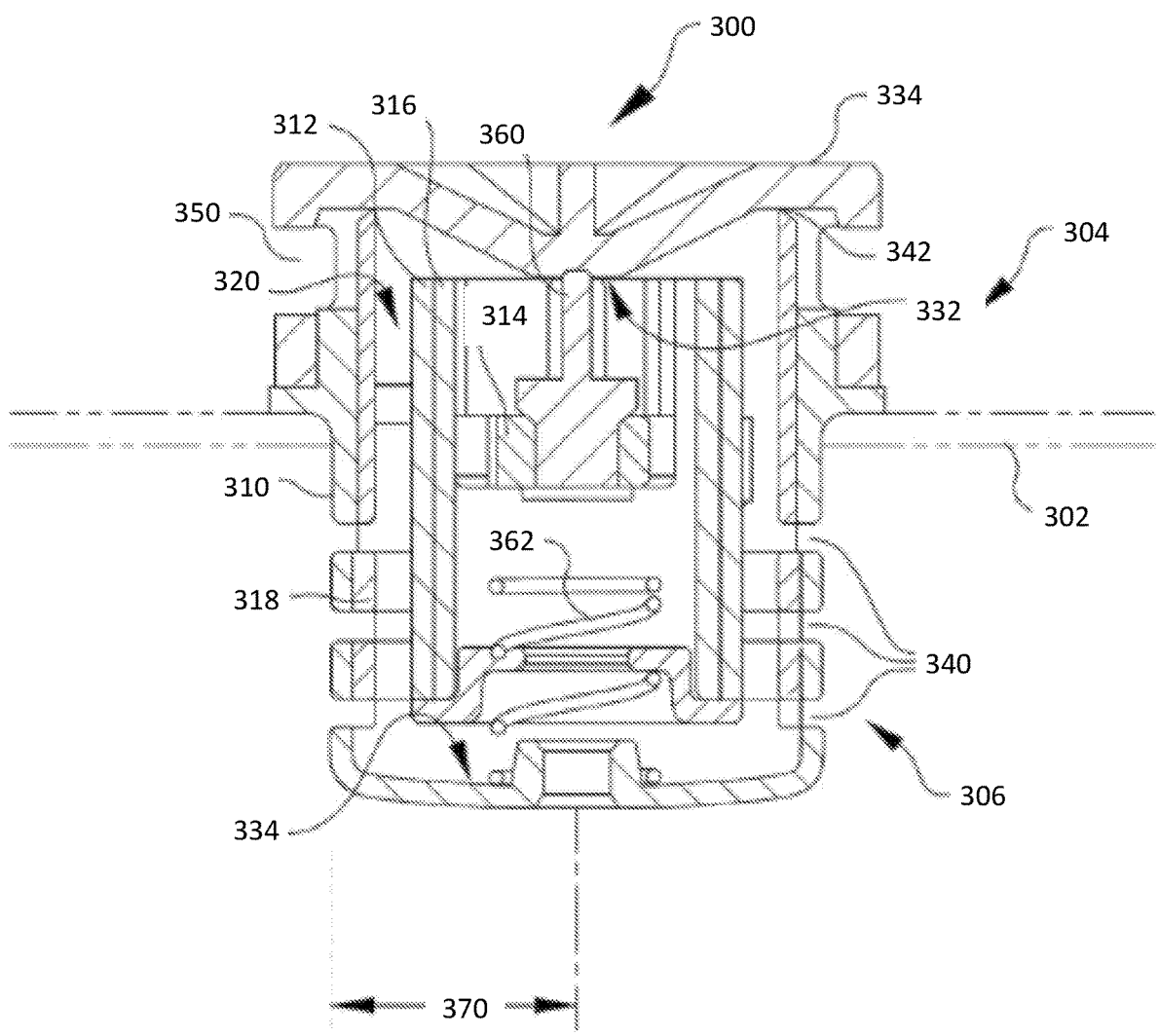
FIG. 9 is a perspective view of a moisture pump having a differential valve in an adsorbing configuration according to one embodiment.

FIG. 8 is cutaway side view of the moisture pump 300 in a desorption configuration having a differential valve area. FIG. 9 shows the moisture pump 300 in an absorption configuration. The moisture pump 300 includes a housing 310 containing a valve assembly 318. The valve assembly 318 includes a blocking member arranged adjacent to the housing 310, and any suitable linkage for mechanically connecting the blocking member to the actuator 360. Interior to the housing 310 is a chamber 320 containing a bentonite material 312 adjacent to a heat spreader 316, which is thermally connected with a heater 314. This places the heat spreader 316 in contact with both the heater 314 and bentonite material 312. An assembly of the heater 314, heat spreader 316, bentonite material 312, and valve assembly 318 are biased against an inner surface 332 of a first end 334 of the housing 310 by an actuator 360; and biased against a second end 336 of the housing by a spring 362. The actuator 360 is operable to move the valve assembly 318 inside the housing 310. As shown, the actuator 360 moves the entire assembly of the heater 314, heat spreader 316, bentonite material 312, and valve assembly 318 when it actuates; but in practice, an actuator may be mechanically coupled with few of the interior components of the moisture pump 300, e.g., with just the valve assembly 318.

The housing 310 defines one or more chambers for containing or transmitting moisture. As shown in FIGS. 8 and 9, the housing 310 defines a chamber 320. In operation, water vapor is selectively transmitted into the chamber 320 through the adsorption ports 340 and, in turn, from the chamber 320 out through the desorption port 342, shown open in FIG. 8 and closed in FIG. 9. In certain embodiments, the chamber 320 is cylindrical, and the bentonite material 312 is arranged on an outer surface of the heat spreader 316 facing outward toward the chamber 320, and toward an inner wall of the housing 310. The chamber 320 forms a void that surrounds the bentonite material 312 and provides for moisture transfer between the bentonite material 312 and air in the chamber 330. Vapor transmitted from the chamber 330 out from the desorption port 342 generally passes unobstructed through to the external environment 304 via a desorption opening 350. In certain embodiments, a small percentage of vapor may condense on surfaces inside the opening 350, which overhangs the desorption port 342 to prevent or mitigate intrusion of foreign objects and external moisture. In general, "desorption port" refers to the region where the valve assembly 318 transits to block airflow between the chamber 320 and the external environment 304. The desorption port 342 may be separated from the external environment 304 by an additional volume of air (e.g. opening 350); or may connect directly to the external environment. In optional embodiments, a membrane may cover the opening 350.

The housing 310 is formed generally in the shape of a cylinder having one or more diameters. The housing 310 optionally includes one or more openings (not shown) for housing an electrical conductor (not shown). The electrical conductor allows for the delivery of electrical power to the interior of housing 310, such as to heater 314. In certain embodiments, the valve assembly 318 and the housing 318 may both be in the form of cylinders, with the valve assembly nested inside the housing.

As described above, the heater 314 directs heat to the heat spreader 316 for heating the bentonite material 312. The heater 314 is optionally powered through an electrical conductor operatively coupled thereto, which is positioned through one or more openings of the housing 310. A non-limiting example of a heater 314 is a positive thermal coefficient (PTC) heater.

In operation, the moisture pump 300 is transitionable between an adsorption configuration and a desorption configuration. FIGS. 8 and 9 shows the desorption configuration, in which the valve assembly 318 is positioned in a desorption position, such that the adsorption ports 340 are blocked by the valve assembly 318, and the desorption port 342 is open between the first end 332 of the housing 310 and the valve assembly 318. This desorption position blocks airflow between the interior atmosphere 306 and the chamber 320, while allowing airflow between the chamber 320 and the exterior 304. The moisture pump 300 is generally in the desorption configuration when the heater 314 is actively heating the heat spreader 316 and bentonite material 312, such that moisture contained in the bentonite material 312 is being vaporized out and allowed to exit the moisture pump 300 through the desorption port 342.

The moisture pump 300 can be held in the desorption configuration by the actuator 360, which presses against the inner surface 332 of the first end 334 of the housing 310. In various embodiments, the actuator 360 is a thermomechanical actuator responsive to temperature. In some embodiments, the actuator 360 includes a phase change material, e.g., a phase change drive. As used herein, a phase change material expands or contracts in response to temperature such that, for example, the phase change material expands in response to being heated and contracts in response to cooling down. Non-limiting examples of phase change materials include wax (e.g., paraffin wax), bimetal elements, and Nitinol. The actuator 360 is mechanically connected with the valve assembly 318 so that, when the actuator expands and contracts, the valve assembly can move between the adsorption and desorption positions.

The moisture pump 300 can be held in the desorption configuration for a predetermined period of time, i.e., a desorption or regeneration time period sufficient for the removal of moisture from the desiccant. The desorption or regeneration time period is a comparatively fast process. Active heating of the bentonite material 312 removes moisture from the bentonite material, regenerating the bentonite material, and heating of the chamber 320 causes strong convective air currents that help transport moisture out of the moisture pump 300 relatively quickly. Due to the heat-driven convection, the desorption port 342 can have a relatively small area without impairing the ability of the moisture pump 300 to exhaust moisture. In certain embodiments, the desorption or regeneration can be achieved by heating the desiccant to a desorption temperature that is greater than or equal to 95° C. In one embodiment, the desiccant member desorbs moisture at a temperature that is greater than the boiling point of the siloxanes and/or organics in the atmosphere. The desorption temperature may range from 95° C. to 150° C., e.g., from 105° C. to 150° C., or from 110° C. to 135° C.

Once the bentonite material is sufficiently regenerated, typically after 10-30 minutes, any further time heating is wasted power and heat. Further, because the valves assembly 318 is arranged to prevent access between the inside atmosphere 306 of the protected casing 302 and the chamber 320 when in the desorption configuration, there is no moisture reduction function during the desorption (regeneration) period. Therefore, it is desired to heat the chamber 320 for a relatively short time as compared to an adsorption time period.

FIG. 9 shows the moisture pump 300 in the desorption configuration from a side perspective (exterior) view. As shown, the valve assembly 318 is lowered to the desorption position, opening the desorption port 342, which is visible through the desorption opening 350. The adsorption ports 340 are closed by the valve assembly 318.

In one embodiment, the adsorption port 340 can have a differential valve area compared to the desorption port 342. The asymmetry of the areas of the adsorption and desorption port can provide for more rapid adsorption of moisture during an adsorption period in which the moisture pump 300 is in the adsorption configuration. The effectiveness of the desorption port at venting moisture during the desorption period is unaffected by having a smaller area. As shown in FIGS. 8-9, the adsorption port 340 includes multiple openings arranged circumferentially around the housing 310. Thus, the adsorption area can be defined by a total of the open areas of all openings that make up the adsorption port 340. For example, an adsorption area can be defined in terms of the height of each opening comprising the adsorption port 340, the circumference (which can be defined in terms of the radius 370 of the housing 310), and the number of rows of openings that comprise the adsorption port, less any supporting structure of the housing that obstructs the openings. In contrast, the desorption area is defined in terms of the desorption port 342, in which case the desorption area can be defined in terms of the height of the desorption port and the circumferences of the housing 310. In general, the height of each opening of the adsorption port 340 will be approximately equal to, or slightly less than, the height of the desorption port 342. Thus, in general, the adsorption area of the moisture pump will exceed the desorption area by a factor that is about equal to, or slightly less than, the number of parallel rows of openings that comprise the adsorption port 340. In certain embodiments, the parallel rows of openings comprising the adsorption port 340 run perpendicular to a direction of travel of the valve assembly 318, and are offset from one another in the direction of travel of the valve assembly. In one embodiment, the adsorption area can be between 800 and 1000 mm$^2$, between 700 and 1000 mm$^2$, between 600 and 1000 mm$^2$, between 500 and 1000 mm$^2$, or between 500 and 1200 mm$^2$.

In another embodiment, the valve assembly 318 may have a variable size (e.g. a stepped size at the adsorption port that is less than, or greater than, the size of the valve assembly at the desorption part). For example, in some embodiments, the moisture pump 300 may have a substantially cylindrical housing 310 at the adsorption port 340, and a substantially cylindrical housing at the desorption port 342, but have a stepped radius of the housing that differs between the adsorption and desorption ports. Under this configuration the valve assembly 318 can also have a stepped radius and be configured to nest inside the housing 310.

In the configurations shown in FIGS. 8-9, and in similar configurations, the adsorption area can be increased by increasing the number of rows of openings that comprise the adsorption port 340. Thus, the height and circumference of each row of openings of the adsorption port 340 do not limit the adsorption area, because additional rows of openings can be provided. In contrast, moisture pumps that employ a single adsorption port must provide sufficient travel of an adsorption valve to provide sufficient adsorption area; or must provide a larger radius of the adsorption valve. Thus, the configurations shown in FIGS. 8-9 can provide adequate adsorption area with smaller travel than conventional moisture pumps, and in a device with a smaller footprint. By way of example, in some embodiments, sufficient adsorptive efficiency can be provided in a moisture pump with a radius of 20 mm or less, e.g., 25 mm or less, or 30 mm or less. In certain embodiments, three or more rows of openings may be provided in the adsorption port 340, each of which may have individual heights of 3 mm or less, e.g., 3.5 mm or less, or 4.0 mm or less. In certain embodiments, the height of the adsorption port 340 may vary from row to row and in other embodiments, the adsorption ports 340 in each row has the same height. The height of the desorption port 342 may be 3 mm or less, e.g., 3.5 mm or less, 4.0 mm or less, or 5.0 mm or less. Due to the number of rows the total height of the adsorption ports 340 provides a differential valve area compared to the area the desorption port 342. The total height of the adsorption port is greater than the height of the desorption port, e.g., at least twice as large or at least three times as large. In some embodiments, more than three rows of openings may be provided in the adsorption port 340, depending on the application and on the depth to which the moisture pump 300 is permitted to penetrate into the interior of casing 302. For example, in applications requiring low adsorption rates, the adsorption port 340 can comprise two or three rows of openings. In applications requiring greater adsorption rates, the adsorption port 340 can comprise three or more rows of openings. In certain embodiments, the height of the desorption port 342 can be equal to a distance that the valve assembly 318 is permitted to travel (i.e. the valve travel). The heights of individual windows making up the adsorption port 340 can also be equal to, or less than, the valve travel. In some embodiments, the windows of the adsorption port may be slightly narrower than the distance of the valve travel to ensure that air cannot pass around the valve assembly at the adsorption port when the adsorption port is closed.

The configuration of the adsorption port 340 can also affect the efficiency of the adsorption process by providing a shortened path for airflow and/or moisture diffusion from the inside atmosphere 306 to encounter the bentonite material 312. In certain embodiments, and as shown in FIGS. 8-9, the adsorption port 340 comprises multiple rows of openings that are positioned around and encompassing at least part of the bentonite material 312 across a region of the chamber 320. In this and similar arrangements, the air from the inside atmosphere 306 can readily pass through the adsorption port 340 at many points around the circumference of the housing 310, and readily encounter the bentonite material 31 without having to traverse the chamber 320. This arrangement contrasts with moisture pumps that have a singular adsorption port at one side or end, in which case, air entering the moisture pump would first encounter only a small part of the desiccant.

The bentonite material 312, heater 314, and heat spreader 316 are shown positioned in or maintained in the chamber 320. The bentonite material 31 is exposed to the moisture in the air of chamber 320. In other embodiments (not shown), bentonite material 312, heater 314, and heat spreader 316 may be partially positioned in the chamber 320. In yet other embodiments (not shown), the heater 314 may be positioned outside of the chamber 320 and the heat spreader 316 is position in or partially positioned in the chamber 320. Embodiments described above refer primarily to a substantially cylindrical moisture pump 300, however, it will be understood that the principles herein described may be applied with reference to any other suitable shape where a valve assembly 318 can be slidingly positioned within a housing 310. In various alternative embodiments, the housing 310 and associated valve assembly 318 can have an elliptical cross section, rectangular cross section, or any other suitable cross section. As discussed above, various alternative embodiments may also employ stepped cross-sectional areas.

Embodiments shown in FIGS. 8-9 are operable without a second chamber, e.g., condensation chamber, and air can flow directly into the exterior environment 306 from the chamber 320 when the moisture pump 300 is in the desorbing configuration. In other embodiments, a condensation chamber may be included. As described above when a condensation chamber is used there may be a vent port and a membrane covering the vent port. The venting port provides an opening for water vapor transmission out of the condensation chamber and to, for example, the outside environment. The vent port is operable to prevent intrusion of some substances into the moisture pump, e.g. debris, liquid water, oils, and/or other substances. Water vapor collects in the condensation chamber during desorption and exits the venting port out of the condensation chamber. In certain embodiments at least a portion of the water vapor precipitates inside the condensation chamber before being transmitted out of the condensation chamber. For example, condensed liquid water can evaporate over time into the air of the condensation chamber while the desorption port is closed (i.e. in the adsorption configuration) and subsequently pass through the venting port or out of a drain portion (not shown). In certain embodiments, the membrane or membranes making up the venting port can be water vapor permeable but impermeable to debris and liquid water, so as to prevent intrusion or debris or liquid water from the outside environment into the moisture pump. One or more membranes may also be present covering the adsorption ports (not shown), e.g. to prevent particles freed from the desiccant from entering the inside environment.

The desiccant member comprising bentonite may be flexible to allow the bentonite material to be assembled with heating chamber having a variety of internal dimensions by flexing the desiccant layer. The flexible desiccant layer can also be arranged to provide a ratio of surface area to volume, which can enhance adsorption of water vapor, by winding a desiccant in a heating chamber.

A flexible desiccant member comprising a bentonite material may be sufficiently strong to prevent particles from being released. This prevents a loss of bentonite material thereby increasing lifetime of the member. In addition, the release of fewer particles reduces the need for a debris chamber or other means for removal of particles from within the casing. Flexible desiccant members may also increase the packing efficiency of bentonite material in the chamber by providing for greater concentrations of bentonite material. Packing efficiency, as used herein, is intended to mean the amount (loading) of bentonite material per device or in a flexible desiccant member. High loading in a flexible desiccant member allows for smaller (i.e. thinner) layers of flexible desiccant members to achieve an effective total desiccant load for drying an enclosure. For example, in some embodiments, the packing efficiency of flexible desiccant members may be more than 50% by mass (i.e., a mass of the dry desiccant member may be 50% or more desiccant compared to 50% or less flexible substrate or matrix). In some cases, the packing efficiency of bentonite material in the desiccant member may be more than 90% by mass. In at least one embodiment, the moisture pump may use 3-4 grams of bentonite material for an enclosure having a protected volume of 6 L to 14 L volume of the enclosure that is to be protected by the moisture pump. The 3-4 grams of bentonite material can be provided in a desiccant member having a thickness of about 2 mm, and an outside face surface area of about 3414 $mm^2$. In some embodiments, more than 4 grams of bentonite material can be included in the desiccant member.

In certain embodiments, the desiccant member may be high-temperature (HT) resistant and capable of withstanding temperatures in excess of 95° C., e.g. in excess of 105° C., or in excess of 150° C. In general, withstanding a high temperature means that the desiccant member can retain its desiccant properties and structural properties (i.e. remain structurally sound or stand under its own weight) at high temperature. Flexible desiccant member may also be HT resistant. Generally, desiccant members can regenerate their ability to adsorb vapor when heated repeatedly. Heat drives off moisture from the bentonite material, thereby restoring its adsorptive capacity in a shorter period of time. Some desiccant members can desorb at least 15% of their 22° C./50% RH equilibrium moisture content when heated to 95° C. in about 5 minutes or less; or at least 25% of their 22° C./50% equilibrium moisture content when heated to 101° C. in about 5 minutes or less. It will be understood that the specific times to regenerate a desiccant member may depend on the desiccant thickness, the specific temperature, the ambient humidity, the efficiency of heating, and other factors. In some embodiments, the desiccant members can desorb at least 40% of captured moisture at a 22° C./50%

RH equilibrium moisture content within 20 minutes at a desorption temperature of 95° C. In some other embodiments, the desiccant members can desorb at least 60% of captured moisture at a 22° C./50% RH equilibrium moisture content within 20 minutes at a desorption temperature of 95° C. To desorb quickly, a desiccant member can be heated to temperatures of 105° C. or greater. For temperatures in the 105° C. range and greater, the desiccant members should be resistant to melting and deformation at those high temperatures for long periods of time, e.g., for up to 3 hours. Specific desiccants and structural materials operable above 105° C. include flexible PTFE impregnated with a bentonite material. In some embodiments, the desiccant member is fixed to the heat spreader by an epoxy adhesive layer that can survive temperatures up to about 150° C. In some embodiments, a heated moisture pump may be configured to operate at temperatures greater than 150° C. In such cases, a desiccant, including desiccants comprising bentonite-impregnated ePTFE, may tolerate temperatures in excess of 175° C. or 200° C. Desiccant members can be attached with a heat spreader by attachment means tolerant to temperatures in excess of 150° C. including, but not limited to, high-temperature tolerant adhesives and mechanical means. For example, in some embodiments, desiccant members can be attached with a heat spreader by way of a high-temperature tolerant mesh, net, or cage surrounding the desiccant member and heat spreader without obstructing airflow to the bentonite material. Such a mesh, net, or cage may be formed of a high-temperature polymer, metal, or other suitable material.

ADDITIONAL EMBODIMENTS

Additional non-limiting embodiments are further described.

E1. A desiccant member comprising a polymer material and a bentonite material, wherein the desiccant member is capable of maintaining a working moisture capacity in a regenerable manner while absorbing moisture from an atmosphere containing siloxanes, organic compounds having a boiling point greater than 60° C., or mixtures thereof.

E2. The desiccant member of example E1, wherein the siloxanes concentration in the atmosphere is at least 1 ppm or more.

E3. The desiccant member of any one of examples E1 or E2, wherein the organic compounds concentration in the atmosphere is at least 1 ppm or more.

E4. The desiccant member of any one of examples E1 to E3, wherein the organic compounds having a boiling point greater than 60° C. comprise aromatic alcohols or aliphatic alcohols.

E5. The desiccant member of any one of examples E1 to E4, having a packing efficiency of 50% to 90% by mass.

E6. The desiccant member of any one of examples E1 to E5, wherein the desiccant member is flexible.

E7. The desiccant member of any one of examples E1 to E6, wherein the bentonite material comprises sodium bentonite, calcium bentonite, or mixtures thereof.

E8. The desiccant member of any one of examples E1 to E7, wherein the bentonite material comprises one or more phyllosilicates, preferably montmorillonite, saponite, beidellite, and/or hectorite.

E9. The desiccant member of any one of examples E1 to E8, wherein the bentonite material comprises minerals from the smectite family of clay materials.

E10. The desiccant member of any one of examples E1 to E9, wherein the bentonite material comprises montmorillonite.

E11. The desiccant member of any one of examples E1 to E10, being substantially free of silica gel.

E12. The desiccant member of any one of examples E1 to E11, wherein the polymer material has a melting point above the regeneration temperature of the bentonite material.

E13. The desiccant member of any one of examples E1 to E12, wherein the polymer material comprises polyolefins, polyurethanes, or fluoropolymers.

E14. The desiccant member of any one of examples E1 to E13, wherein the polymer material comprises expanded fluoropolymer, expanded polyethylene, or expanded polypropylene.

E15. The desiccant member of any one of examples E1 to E14, wherein the polymer material comprises expanded polytetrafluoroethylene.

E16. The desiccant member of any one of examples E1 to E15, wherein the desiccant member is configured to be in a three dimensional shape comprising fibers, sheets, tubes, tapes, pellets, or beads.

E17. The desiccant member of any one of examples E1 to E16, wherein the moisture capacity of the bentonite material is substantially retained after being regenerated.

E18. The desiccant member of any one of examples E1 to E17, wherein the bentonite material has a reduced moisture capacity change.

E19. The desiccant member of any one of examples E1 to E17, wherein the bentonite material has a moisture capacity change of no more than 75% at 11.5 $g/m^3$ water vapor concentration and 67 regeneration cycles.

E20. The desiccant member of any one of examples E1 to E17, wherein the bentonite material has a moisture capacity change of no more than 90% at 11.5 $g/m^3$ water vapor concentration and 536 regeneration cycles.

E21. The desiccant member of any one of examples E1 to E20, wherein the working moisture capacity is maintained.

E22. The desiccant member of any one of examples E1 to E20, wherein the working moisture capacity is greater than 25% of the initial moisture capacity at 11.5 $g/m^3$ water vapor concentration and 67 regeneration cycles.

E23. The desiccant member of any one of examples E1 to E20, wherein the working moisture capacity is greater than 10% of the initial moisture capacity at 11.5 $g/m^3$ water vapor concentration and 536 regeneration cycles, preferably greater than 15% of the initial moisture capacity at 11.5 $g/m^3$ water vapor concentration and 536 regeneration cycles.

E24. The desiccant member of any one of examples E1 to E23, wherein the member has a thickness from 0.1 to 15 mm.

E25. The desiccant member of any one of examples E1 to E24, wherein the member desorbs moisture at a temperature that is greater than the boiling point of the organics in the atmosphere.

E26. The desiccant member of any one of examples E1 to E25, wherein the polymer material is a porous polymer matrix.

E27. The desiccant member of example E26, wherein the bentonite material is positioned within the porous polymer matrix.

E28. The desiccant member of example E26, wherein the porous polymer matrix is a sheet, tube, or tape, and the porous polymer matrix comprises PTFE.

E29. The desiccant member of example E26, wherein the porous polymer matrix comprises an interconnected network having voids.

E30. The desiccant member of example E26, wherein loading of the bentonite material in the porous polymer matrix is from 50 to 99%, based on the total weight of the desiccant member.

E31. The desiccant member of any one of examples E1 to E24, wherein the polymer material is a layer adjacent to the bentonite material.

E32. The desiccant member of example E31, wherein the porous polymer matrix encapsulates the bentonite material to form a pouch.

E33. The desiccant member of example E31, wherein the bentonite material is from 50 to 99%, based on the total weight of the desiccant member.

E34. The desiccant member of any one of examples E1 to E24, further comprising one or more beads of the bentonite material is adhered to a surface of the polymer material.

E35. An enclosure assembly comprising: a housing comprising a first chamber having a heater, at least one adsorption port into the first chamber, and a bentonite material disposed proximate to the at least one adsorption port; and a valve assembly located within the housing and being transitionable between an adsorption position and a desorption position.

E36. The enclosure assembly of example E35, wherein the housing further comprises a venting port out of the first chamber.

E37. The enclosure assembly of any one of examples E35 or E36, wherein the adsorption position seals a desorption port between the first chamber and the venting port and opens the adsorption port into the first chamber for water vapor transmission into the first chamber.

E38. The enclosure assembly of any one of examples E35 to E37, wherein the valve area of the adsorption port is greater than the valve area of the desorption port.

E39. The enclosure assembly of any one of examples E35 to E38, wherein the desorption position seals the adsorption port and opens the desorption port between the first chamber and the venting port chamber for water vapor transmission out of the first chamber.

E40. The enclosure assembly of any one of examples E35 to E39, wherein the housing further comprises a condensation chamber, and a venting port out of the condensation chamber.

E41. The enclosure assembly of example E40, wherein the adsorption position seals a desorption port between the first chamber and the condensation chamber and opens the adsorption port into the first chamber for water vapor transmission into the first chamber.

E42. The enclosure assembly of example E40, wherein the desorption position seals the adsorption port and opens the desorption port between the first chamber and the condensation chamber for water vapor transmission out of the first chamber.

E43. The enclosure assembly of any one of examples E35 to E42, wherein the atmosphere contains siloxanes, organics having a boiling point greater than 60° C., or mixtures thereof is exposed to the bentonite material.

E44. The enclosure assembly of example E43, wherein the siloxanes concentration in the atmosphere is at least 1 ppm or more.

E45. The enclosure assembly of any one of examples E43 or E44, wherein the organic compounds concentration in the atmosphere is at least 1 ppm or more.

E46. The enclosure assembly of any one of examples E43 to E45, wherein the organic compounds having a boiling point greater than 60° C. comprise aromatic alcohols or aliphatic alcohols.

E47. The enclosure assembly of any one of examples E35 to E46, wherein the bentonite material is sodium bentonite or calcium bentonite.

E48. The enclosure assembly of any one of examples E35 to E47, wherein the bentonite material comprises one or more phyllosilicates, preferably montmorillonite, saponite, beidellite, and/or hectorite.

E49. The enclosure assembly of any one of examples E35 to E48, wherein the bentonite material comprises minerals from the smectite family of clay materials.

E50. The enclosure assembly of any one of examples E35 to E49, wherein the bentonite material comprises montmorillonite.

E51. The enclosure assembly of any one of examples E35 to E50, being substantially free of silica gel.

E52. The enclosure assembly of any one of examples E35 to E51, further comprising a desiccant member comprising the bentonite material.

E53. The enclosure assembly of example E52, wherein the desiccant member is flexible.

E54. The enclosure assembly of any one of examples E52 or E53, having a packing efficiency of 50% to 90% by mass.

E55. The enclosure assembly of any one of examples E52 to E54, wherein the desiccant member is configured to be in a three dimensional shape comprising fibers, sheets, tubes, tapes, pellets, or beads.

E56. The enclosure assembly of any one of examples E52 to E55, wherein the moisture capacity of the bentonite material is substantially retained after being regenerated.

E57. The enclosure assembly of any one of examples E52 to E56, wherein the bentonite material has a reduced moisture capacity change.

E58. The enclosure assembly of any one of examples E52 to E56, wherein the bentonite material has a moisture capacity change of no more than 70% at 11.5 $g/m^3$ water vapor concentration and 67 regeneration cycles.

E59. The enclosure assembly of any one of examples E52 to E56, wherein the bentonite material has a moisture capacity change of no more than 90% at 11.5 $g/m^3$ water vapor concentration and 536 regeneration cycles.

E60. The enclosure assembly of any one of examples E52 to E56, wherein the working moisture capacity is maintained.

E61. The enclosure assembly of any one of examples E52 to E56, wherein the bentonite material has a working moisture capacity is greater than 25% of the initial moisture capacity at 11.5 $g/m^3$ water vapor concentration and 67 regeneration cycles.

E62. The enclosure assembly of any one of examples E52 to E56, wherein the bentonite material has a working moisture capacity is greater than 10% of the initial moisture capacity at 11.5 $g/m^3$ water vapor concentration and 536 regeneration cycles, preferably greater than 15% of the initial moisture capacity at 11.5 $g/m^3$ water vapor concentration and 536 regeneration cycles.

E63. The enclosure assembly of any one of examples E52 to E62, wherein the member has a thickness from 0.1 to 15 mm.

E64. The enclosure assembly of any one of examples E52 to E63, wherein the member desorbs moisture at a temperature that is greater than the boiling point of the organics in the atmosphere.

E65. The enclosure assembly of any one of examples E52 to E64, wherein the desiccant member further comprises a metal screen, textile material, or binder.

E66. The enclosure assembly of any one of examples E52 to E65, wherein the desiccant member further comprises a polymer material comprising a polyolefin, polyurethane, or fluoropolymer.

E67. The enclosure assembly of example E66, wherein the polymer material has a melting point above the regeneration temperature of the bentonite material.

E68. The enclosure assembly of example E66, wherein the polymer material is a porous polymer matrix.

E69. The enclosure assembly of example E68, wherein the bentonite material is positioned within the porous polymer matrix.

E70. The enclosure assembly of example E68, wherein the porous polymer matrix comprises an interconnected network having voids.

E71. The enclosure assembly of example E68, wherein loading of the bentonite material in the porous polymer matrix is from 50 to 99%, based on the total weight of the desiccant member.

E72. The enclosure assembly of example E66, wherein the polymer material is a layer adjacent to the bentonite material.

E73. The enclosure assembly of example E72, wherein the porous polymer matrix encapsulates the bentonite material to form a pouch.

E74. The enclosure assembly of example E72, wherein the bentonite material is from 50 to 99%, based on the total weight of the desiccant member.

E75. The enclosure assembly of example E66, further comprising one or more beads of the bentonite material is adhered to a surface of the polymer material.

E76. An enclosure assembly comprising: a housing configured to retain an electronic device that thermally cycles; an inlet in the housing; and a protective vent inserted into the inlet of the housing, wherein the protective device comprises a rigid body having a port therein to allow airflow therethrough and a bentonite material adjacent to the port.

E77. The enclosure assembly of example E76, wherein the electronic device is a solar inverter.

E78. A protective vent comprising a rigid body having a port therein to allow airflow therethrough and a bentonite material adjacent to the port.

EXAMPLES

The present invention will be better understood in view of the following non-limiting examples.

String Inverter Examples

Examples 1 and 2 demonstrate the retention of moisture sorption capacity of bentonite compounds that were subjected to an environment with the contaminants cited in claim 1. Comparative example 1 demonstrates the significant loss of moisture sorption capacity of silica gel that was subjected to an environment with the contaminants cited in claim 1. Example 3 demonstrate the retention of moisture sorption capacity of a bentonite-PTFE tape that were subjected to an environment with the contaminants cited in claim 1. Comparative example 2 demonstrates the significant loss of moisture sorption capacity of a silica gel-PTFE tape was subjected to an environment with the contaminants cited in claim 1. All sorbent materials were thermally cycled inside a SUN2000-30KTL-US string inverter for these examples. After a defined period of thermal cycles, material samples were removed from the inverter and characterized for water vapor adsorption capacity. The capacity of the cycled material was then compared to its initial capacity.

Example 1

The sorbent material used in this tape example is bentonite powder (Part No. A15795, from Alfa Aesar) having CAS number 1302-78-9. The bentonite was characterized for water vapor sorption capacity at 25° C. on a VTI SGA-100 sorption.

A test apparatus was designed to allow sorbent materials to be thermally cycled inside a Huawei SUN2000-30KTL-US string inverter (Colinda Solar). The apparatus had six locations to test sorbent materials. Each location used custom stereolithographic printed pieces to restrain copper heating pans. The stereolithographic printed pieces were made on 3D Systems Viper SLA system with Somos PerFORM resin. The copper pans were cut from multipurpose 110 copper sheets (Part No. 8963K36, McMaster-Carr) and measured 1.25 inches by 1.625 inches. Heat was applied to each pan via a positive temperature coefficient thermistor (Part No. SOP5173-11, Thermistors Unlimited, Inc). The thermistor was mounted to the underside of the pan with a thermally and electrically conductive epoxy (Part No. AA-Duct 902, Atom Adhesives). The thermistors reached a maximum temperature of 155° C. The apparatus was mounted inside a new SUN2000-30KTL-US string inverter. The inverter was placed in an environmental chamber maintained at 35° C. and 70% ambient relative humidity. During the entirety of the experiment, the inverter was powered to 7.2 kW for 12 hours each day.

1.5 g of Alfa Aesar bentonite was dispensed on a heating pan within the inverter. The sorbent material was thermally cycled as follows: A custom electrical control system applied 12V DC to the thermistor for 60 minutes to desorb moisture from the sorbent material. The thermistor regenerated the sorbent material at 155° C. After the 60 minute heating step, the thermistor was shut off and the sorbent was allowed to adsorb ambient moisture for 90 minutes. During the adsorption step, three axial bladed fans (Part No. 259-1550-ND, Digikey) were turned on for the 90 minute duration to mix the air above the sorbent and increase mass transport into the sorbent. This thermal cycling was continuous and equated to 67 thermal cycles per week.

After periods of thermal cycling, a 20 to 30 mg sample of the sorbent was removed from the inverter. The material was characterized for water vapor sorption capacity at 25° C. on a VTI SGA-100 sorption system. In the sorption capacity characterization, the material was regenerated to 125° C.

Figure 10:
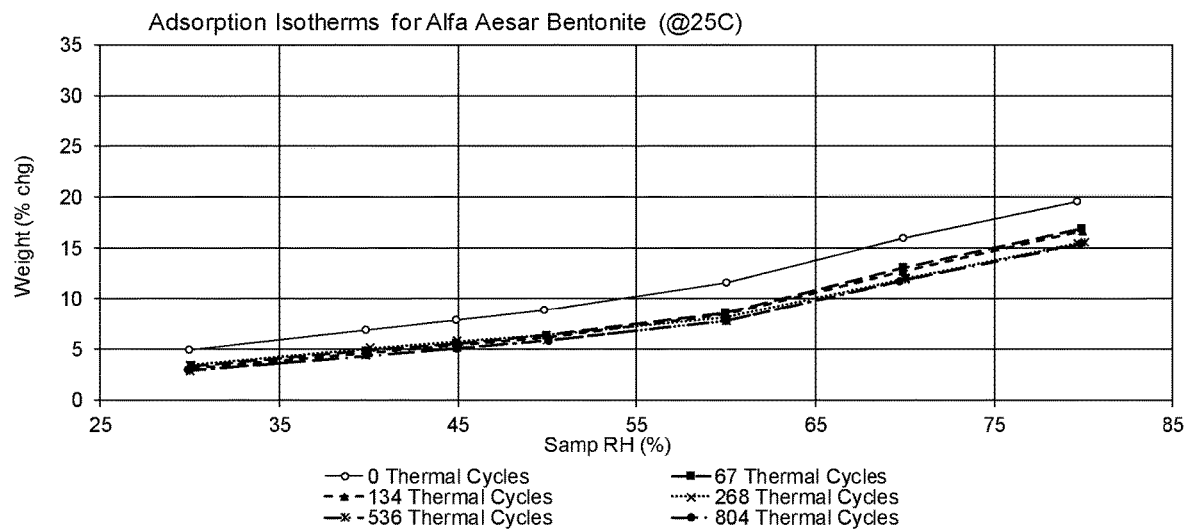
FIGS. 10 and 11 are graphs of the testing for Example 1.
Figure 11:
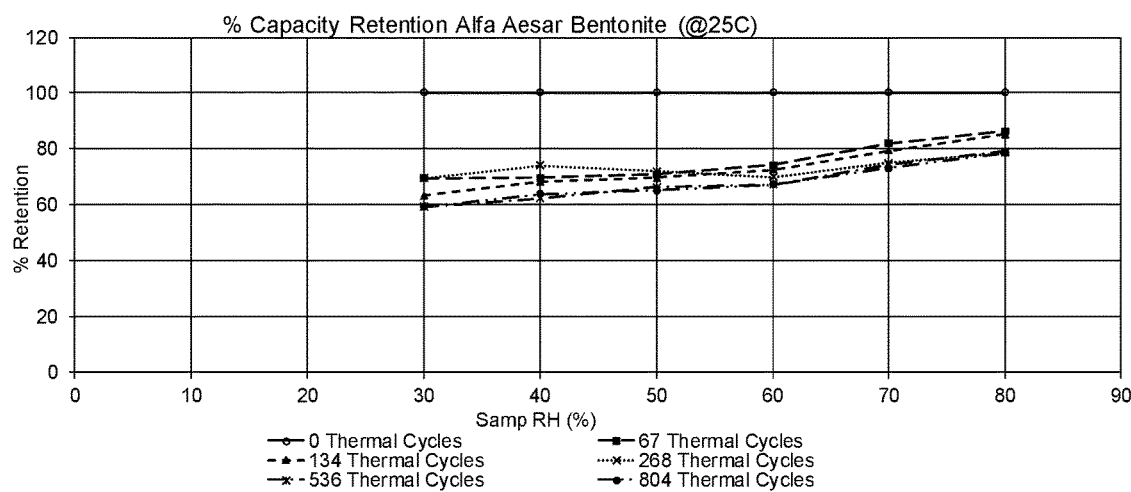

FIG. 10 is a graph from showing the adsorption isotherm in term of weight change % from 30% to 80% relative humidity. As shown in FIG. 10, the weight change % is robust from 67 to 804 cycles across this humidity range. FIG. 11 shows that Example 1 has a high moisture capacity retention.

Comparative Example 1

The sorbent material used in this tape example is silica gel powder (Type A, from Transo-Pharm USA). The silica gel was characterized for water vapor sorption capacity at 25° C. on a VTI SGA-100 sorption system.

The same cycling apparatus was utilized as in Example 1. The apparatus was mounted inside a new SUN2000-30KTL-US string inverter. The inverter was placed in an environmental chamber maintained at 35° C. and 70% ambient relative humidity. During the entirety of the experiment, the inverter was powered to 7.2 kW for 12 hours each day.

1.5 g of Transo-Pharm silica gel was dispensed on heating pans within the inverter. The sorbent material was thermally cycled in the same manner as in Example 1.

Figure 12:
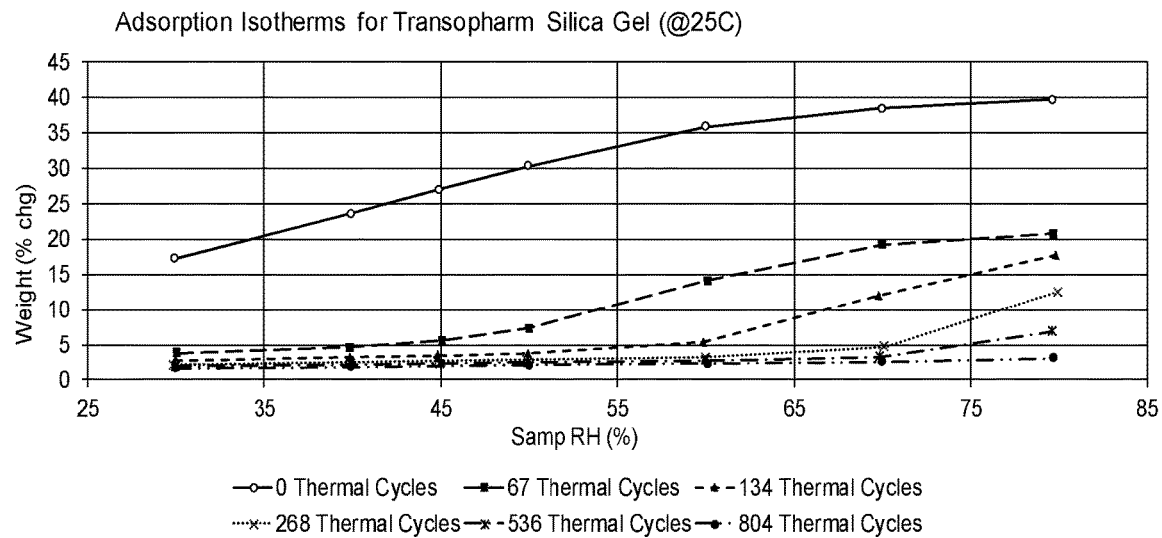
FIGS. 12 and 13 are graphs of the testing for Comparative Example 1.
Figure 13:
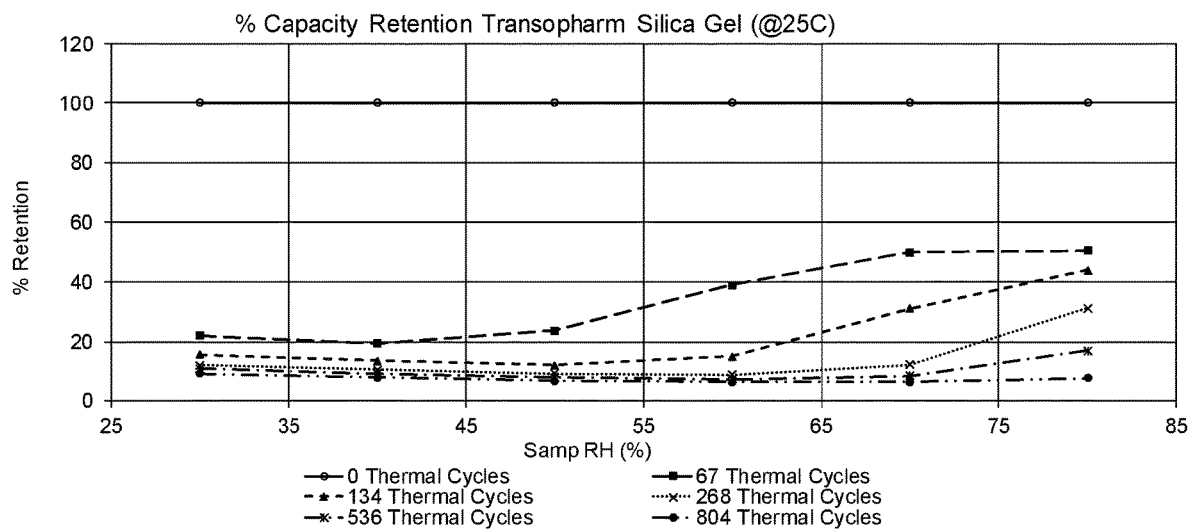

After periods of thermal cycling, a 20-30 mg sample of the sorbent was removed from the inverter. The material was characterized for water vapor sorption capacity at 25° C. on a VTI SGA-100 sorption system. In the sorption capacity characterization, the material was regenerated to 125° C. FIG. 12 is a graph from showing the adsorption isotherm in term of weight change % from 30% to 80% relative humidity, and a noticeable drop in weight change % is shown by comparative example 2. FIG. 13 shows that comparative example 1 has a low moisture capacity retention. This makes comparative example 1 unsuitable for long term applications in demanding environments.

Example 2

The sorbent material used in this tape example is granular bentonite (NatraSorb® M, from Multisorb Technologies) sealed in Tyvek® bags. The bentonite is classified by the supplier with a CAS number 1302-78-9, and is also described as 'montmorillonite clay'. To access the sorbent material, the bags were cut open. The bentonite was characterized for water vapor sorption capacity at 25° C. on a VTI SGA-100 sorption system.

The same cycling apparatus was utilized as in Example 1. The apparatus was mounted inside a new SUN2000-30KTL-US string inverter. The inverter was placed in an environmental chamber maintained at 35° C. and 70% ambient relative humidity. During the entirety of the experiment, the inverter was powered to 7.2 kW for 12 hours each day.

1.5 g of Multisorb bentonite was dispensed on heating pans within the inverter. The sorbent material was thermally cycled in the same manner as in Example 1.

After periods of thermal cycling, a 20-30 mg sample of the sorbent was removed from the inverter. The material was characterized for water vapor sorption capacity at 25° C. on a VTI SGA-100 sorption system. In the sorption capacity characterization, the material was regenerated to 125° C.

Figure 14:
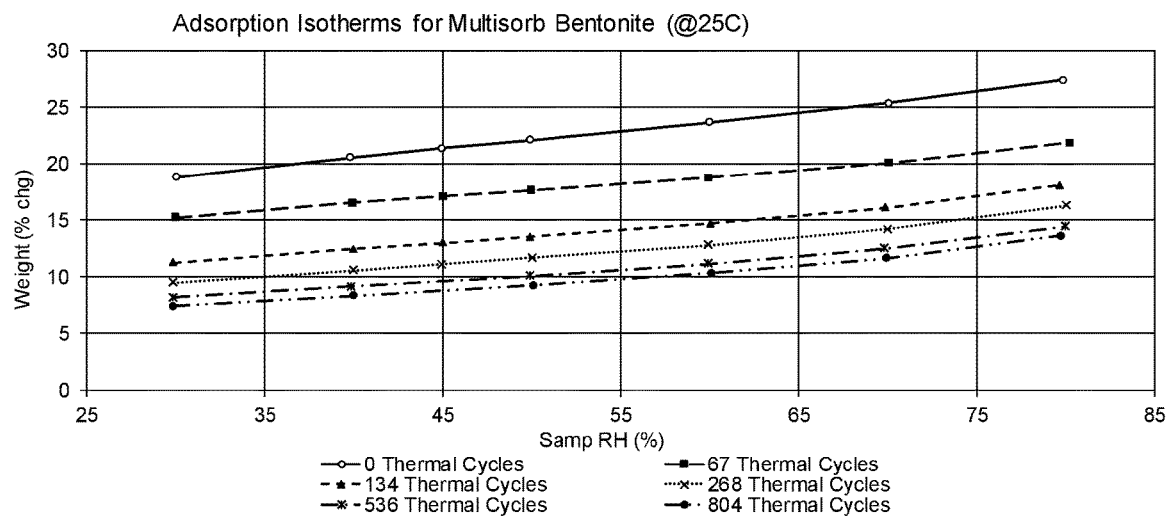
FIGS. 14 and 15 are graphs of the testing for Example 2.
Figure 15:
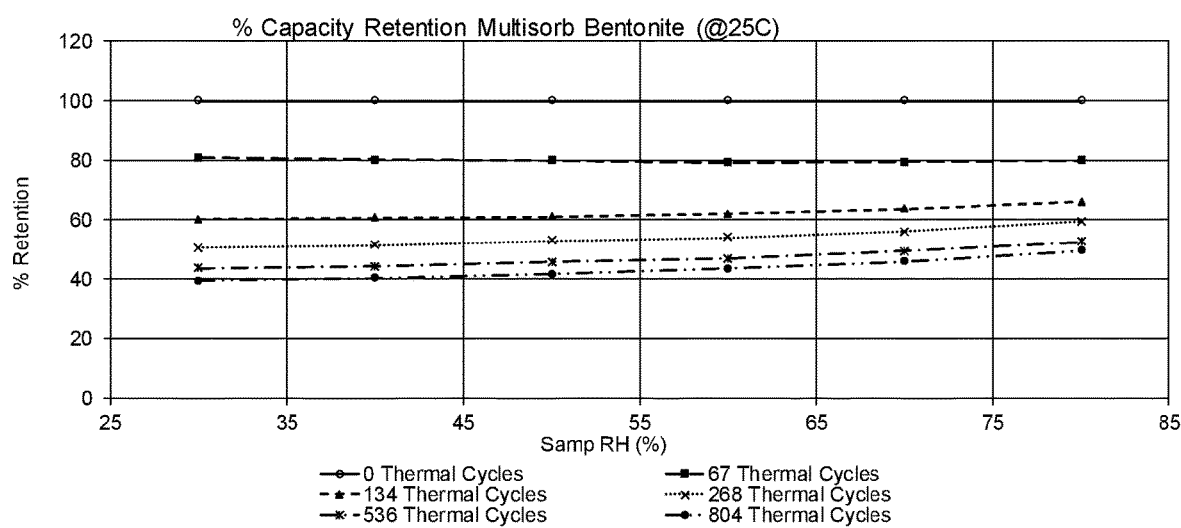

FIG. 14 is a graph from showing the adsorption isotherm in term of weight change % from 30% to 80% relative humidity. As shown in FIG. 14, the weight change % is robust from 67 to 804 cycles across this humidity range. FIG. 15 shows that Example 1 has a high moisture capacity retention.

Figure 16:
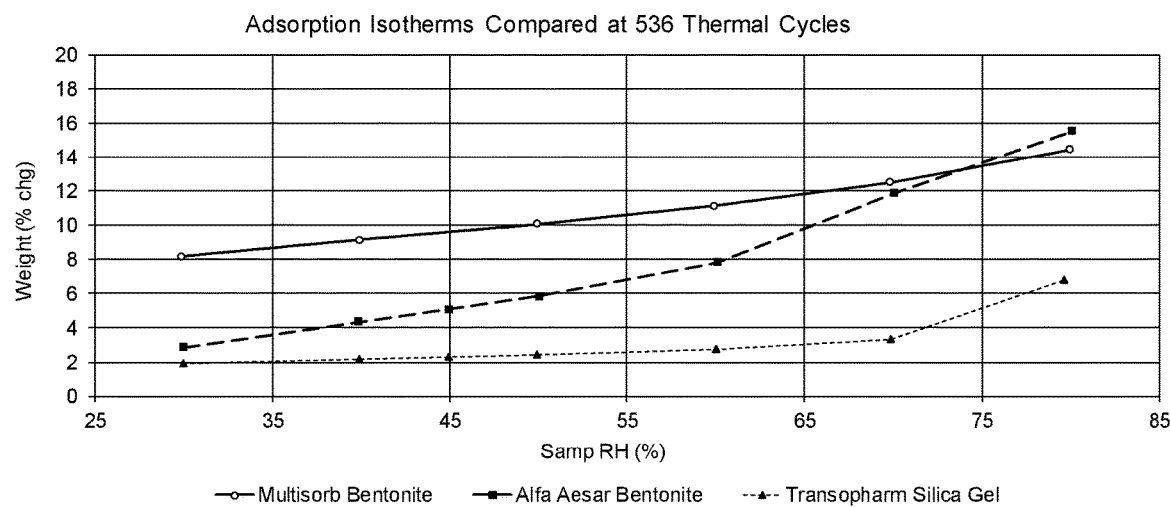
FIGS. 16 and 17 are comparison graphs of Example 1 and 2, and Comparative Example 1 at 536 cycles.

At 536 cycles, representing one year of use in applications, there is a significant improvement in adsorption isotherm in term of weight change % in Examples 1 and 2 over comparative example 1 as shown in FIG. 16 and moisture capacity retention in FIG. 17.

Example 3

A filled tape was tested in a string inverter of Example 1. The sorbent material utilizes a sorbent filled PTFE tape wherein the sorbent particles are entrapped within the regular PTFE structure as taught by U.S. Pat. No. 4,985,296, incorporated by reference. The sorbent material used in this tape example is bentonite powder (Bentonite 34, from Charles B. Crystal Co.). The filled tape was characterized for water vapor sorption capacity at 25° C. on a VTI SGA-100 sorption system. The loading of the bentonite material in the porous PTFE structure is about 80%, based on the total weight of the desiccant member.

A test apparatus was designed to allow sorbent tapes to be thermally cycled inside the Huawei SUN2000-30KTL-US string inverter of Example 1. A 1.25 inch by 1.63 inch by 0.08 inch piece of Charles B. Bentonite-PTFE tape was compressed on a heating pan within the inverter. The sorbent material in was thermally cycled as described in Example 1.

Figure 18:
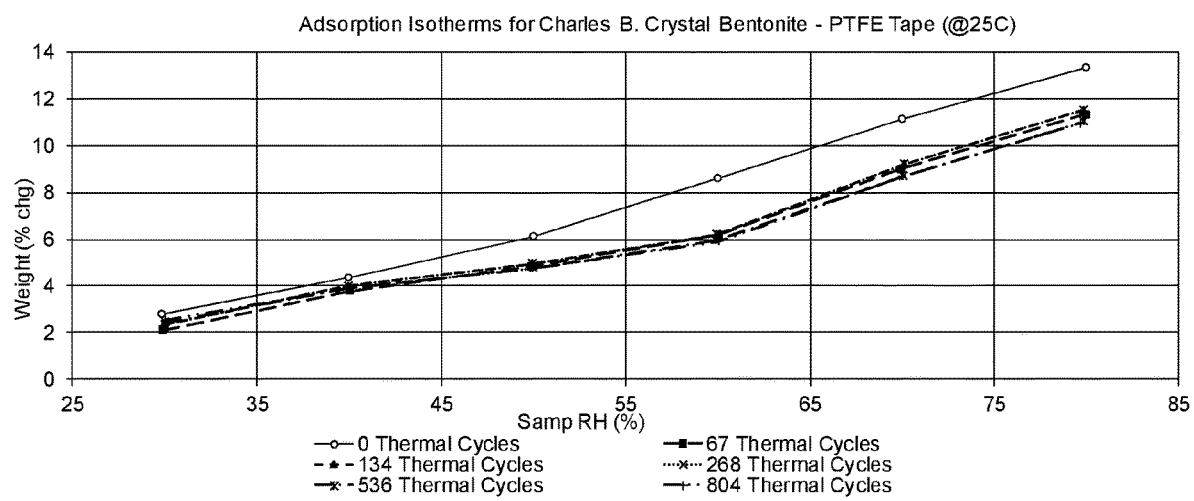
FIGS. 18 and 19 are graphs of the testing for Example 3.
Figure 19:
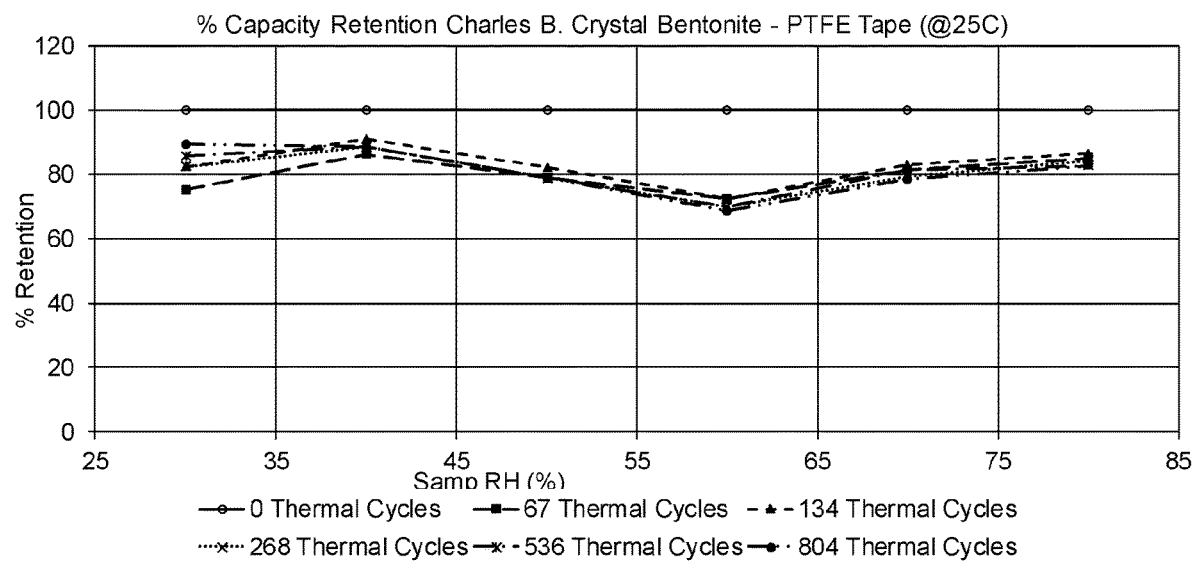

After periods of thermal cycling, a 20 to 30 mg sample of sorbent tape is removed from the inverter. The material was characterized for water vapor sorption capacity at 25° C. on a VTI SGA-100 sorption system. In the sorption capacity characterization, the material is regenerated to 125° C. FIG. 18 is a graph from showing the adsorption isotherm in term of weight change % from 30% to 80% relative humidity. As shown in FIG. 18, the weight change % is robust from 67 to 804 cycles across this humidity range. FIG. 19 shows that Example 3 has a high moisture capacity retention.

Comparative Example 2

Figure 20:
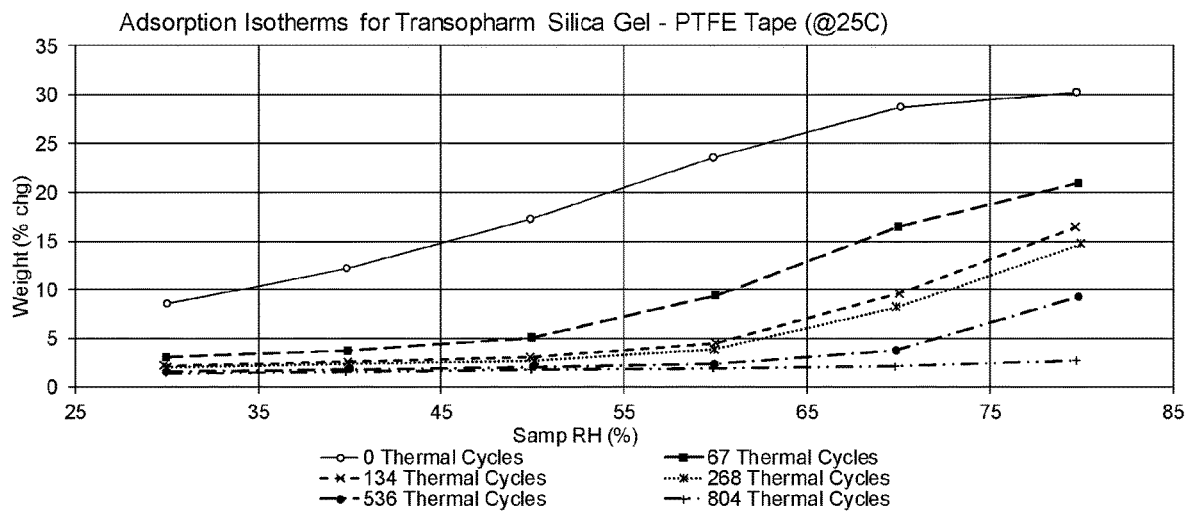
FIGS. 20 and 21 are graphs of the testing for Comparative Example 2.
Figure 21:
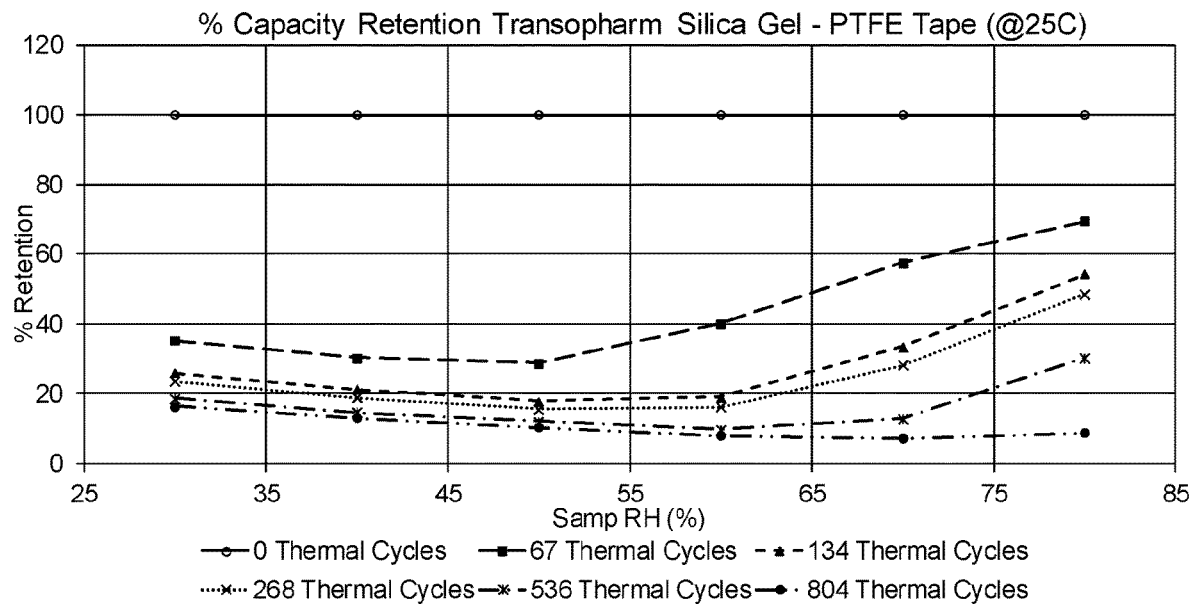

A filled PTFE tape was tested using the silica gel powder (Type A, from Transo-Pharm USA) from comparative example 1. The loading of the silica gel powder was about 80%, based on the total weight of the desiccant member. The testing was under the same conditions as example 1 and the results are compared in the following tables. FIG. 20 is a graph from showing the adsorption isotherm in term of weight change % from 30% to 80% relative humidity, and a noticeable drop in weight change % is shown by comparative example 2. FIG. 21 shows that comparative example 2 has a low moisture capacity retention. This makes comparative example 2 unsuitable for long term applications in demanding environments.

Figure 22:
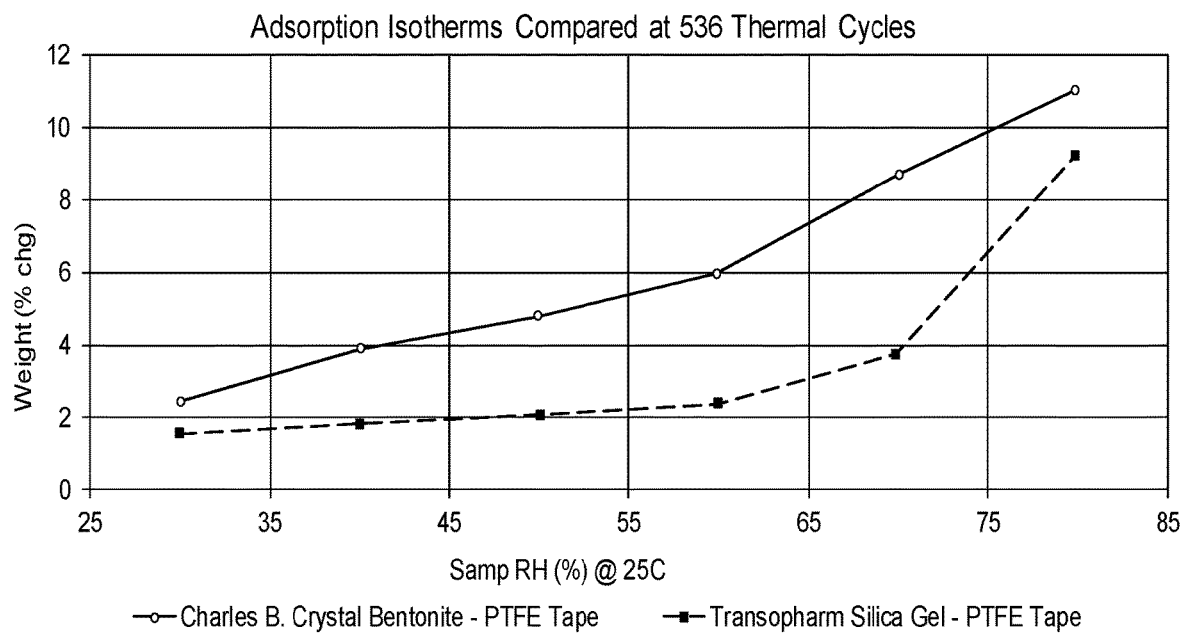
FIGS. 22 and 23 are comparison graphs of Example 3 and Comparative Example 2 at 536 cycles.

At 536 cycles, representing one year of use in applications, there is a significant improvement in adsorption isotherm in term of weight change % in Example 3 over comparative example 2 as shown in FIG. 22 and moisture capacity retention in FIG. 23.

Table 1 shows the moisture capacity of sorbent materials at various water vapor concentrations as a function of thermal cycles inside the inverter. Table 2 shows the percent of moisture sorption capacity retained after the sorbent materials was subjected to thermal cycling. The moisture was tested the following relative humidity: 10% (2.3 @ 25° C. (g/m3)), 30% (6.9 @ 25° C. (g/m3)), 40% (9.2 @ 25° C. (g/m3)), 50% (11.5 @ 25° C. (g/m3)), 60% (13.8 @ 25° C. (g/m3)), 70% (16.1 @ 25° C. (g/m3)), 80% (18.4 @ 25° C. (g/m3)), and 90% (20.7 @ 25° C. (g/m3)). Although the comparative example had higher moisture capacity at an initial cycle, the sorption capacity was not maintained over time making the silica gel less desirable for long-term applications in the string inverter. This is believed to be due to the siloxanes and aromatic alcohols within the string inverter. In contrast the sorption capacity was maintained by the inventive examples over time demonstrating the suitability for long-term sorption capacity.

TABLE 1

| Sorbent Material | Moisture Content @25° C. (g/m3) | Water Vapor Sorption Capacity (% Weight Gain) | | | | | |
|---|---|---|---|---|---|---|---|
| | | 0 Cycles (Initial) | 67 Cycles | 134 Cycles | 268 Cycles | 536 Cycles | 804 Cycles |
| Example 1 | | | | | | | |
| Alfa Aesar bentonite | 2.3 | 1.3 | 0.7 | 0.6 | 0.6 | 0.6 | 0.5 |
| | 6.9 | 4.9 | 3.4 | 3.1 | 3.4 | 2.9 | 2.9 |
| | 9.2 | 6.9 | 4.8 | 4.7 | 5.1 | 4.3 | 4.4 |
| | 11.5 | 8.9 | 6.3 | 6.2 | 6.4 | 5.9 | 5.8 |
| | 13.8 | 11.6 | 8.6 | 8.4 | 8.1 | 7.8 | 7.8 |
| | 16.1 | 16 | 13.1 | 12.7 | 12 | 11.9 | 11.7 |
| | 18.4 | 19.6 | 16.9 | 16.7 | 15.4 | 15.5 | 15.4 |
| | 20.7 | 24.5 | 22.2 | 21.9 | 20.6 | 20.7 | 20.7 |
| Example 2 | | | | | | | |
| Multisorb Bentonite | 2.3 | 10.5 | 9.1 | 5.9 | 5.0 | 4.7 | 4.3 |
| | 6.9 | 18.8 | 15.2 | 11.3 | 9.5 | 8.2 | 7.4 |
| | 9.2 | 20.6 | 16.5 | 12.5 | 10.6 | 9.1 | 8.3 |
| | 11.5 | 22.1 | 17.7 | 13.5 | 11.7 | 10.1 | 9.2 |
| | 13.8 | 23.7 | 18.8 | 14.7 | 12.8 | 11.1 | 10.3 |
| | 16.1 | 25.3 | 20.1 | 16.1 | 14.2 | 12.5 | 11.6 |
| | 18.4 | 27.4 | 21.9 | 18.1 | 16.3 | 14.4 | 13.6 |
| | 20.7 | 31.0 | 25.4 | 22.4 | 20.6 | 18.7 | 18.0 |
| Example 3 | | | | | | | |
| Charles B. Crystal Bentonite/ PTFE | 2.3 | 0.8 | 0.4 | 0.4 | 0.4 | 0.3 | 0.2 |
| | 6.9 | 2.8 | 2.1 | 2.3 | 2.3 | 2.4 | 2.5 |
| | 9.2 | 4.4 | 3.8 | 4 | 3.9 | 3.9 | 3.9 |
| | 11.5 | 6.1 | 4.8 | 5.0 | 4.8 | 4.8 | 4.8 |
| | 13.8 | 8.6 | 6.2 | 6.2 | 6 | 6 | 5.9 |
| | 16.1 | 11.1 | 9 | 9.2 | 8.8 | 9 | 8.7 |
| | 18.4 | 13.3 | 11.3 | 11.5 | 11.2 | 11 | 11 |
| | 20.7 | 16.2 | 14.4 | 15.1 | 14.6 | 14.3 | 14.4 |
| Comparative Example 1 | | | | | | | |
| Transo-Pharm silica gel | 2.3 | 6.4 | 2.0 | 1.5 | 1.2 | 1.1 | 1.0 |
| | 6.9 | 17.2 | 3.8 | 2.7 | 2.1 | 1.9 | 1.6 |
| | 9.2 | 23.6 | 4.6 | 3.2 | 2.5 | 2.2 | 1.9 |
| | 11.5 | 30.3 | 7.2 | 3.7 | 2.8 | 2.4 | 2.1 |
| | 13.8 | 35.8 | 14 | 5.4 | 3.2 | 2.7 | 2.3 |
| | 16.1 | 38.4 | 19.2 | 11.9 | 4.7 | 3.3 | 2.5 |
| | 18.4 | 40 | 20.2 | 17.6 | 12.5 | 6.8 | 3.1 |
| | 20.7 | 41.0 | 21.4 | 18.8 | 17.3 | 12.7 | 7.3 |
| Comparative Example 2 | | | | | | | |
| Transo-Pharm silica gel/ PTFE | 2.3 | 3.3 | 1.6 | 1.2 | 1.1 | 0.3 | 0.3 |
| | 6.9 | 8.5 | 3 | 2.2 | 2 | 1.6 | 1.4 |
| | 9.2 | 12.2 | 3.7 | 2.6 | 2.3 | 1.8 | 1.6 |
| | 11.5 | 17.3 | 5.0 | 3.1 | 2.7 | 2.1 | 1.8 |
| | 13.8 | 23.5 | 9.4 | 4.5 | 3.8 | 2.3 | 1.9 |
| | 16.1 | 28.7 | 16.5 | 9.6 | 8.1 | 3.7 | 2.1 |
| | 18.4 | 30.3 | 21 | 16.4 | 14.7 | 9.2 | 2.7 |
| | 20.7 | 31.0 | 22.3 | 21.0 | 19.5 | 16.4 | 8.2 |

TABLE 2

| Sorbent Material | Moisture Content @25° C. (g/m3) | Percent Water Vapor Sorption Capacity Retained Compared to Initial (%) | | | | | |
|---|---|---|---|---|---|---|---|
| | | 0 Cycles (Initial) | 67 Cycles | 134 Cycles | 268 Cycles | 536 Cycles | 804 Cycles |
| Example 1 | | | | | | | |
| Alfa Aesar bentonite | 2.3 | 100 | 54 | 46 | 46 | 46 | 38 |
| | 6.9 | 100 | 69 | 63 | 69 | 59 | 59 |
| | 9.2 | 100 | 70 | 68 | 74 | 62 | 64 |
| | 11.5 | 100 | 71 | 70 | 72 | 66 | 65 |
| | 13.8 | 100 | 74 | 72 | 70 | 67 | 67 |
| | 16.1 | 100 | 82 | 79 | 75 | 74 | 73 |
| | 18.4 | 100 | 86 | 85 | 79 | 79 | 79 |
| | 20.7 | 100 | 91 | 89 | 84 | 84 | 84 |

TABLE 2-continued

| Sorbent Material | Moisture Content @25° C. (g/m3) | Percent Water Vapor Sorption Capacity Retained Compared to Initial (%) | | | | | |
|---|---|---|---|---|---|---|---|
| | | 0 Cycles (Initial) | 67 Cycles | 134 Cycles | 268 Cycles | 536 Cycles | 804 Cycles |
| Example 2 | | | | | | | |
| Multisorb | 2.3 | 100 | 87 | 56 | 48 | 45 | 41 |
| Bentonite | 6.9 | 100 | 81 | 60 | 51 | 44 | 39 |
| | 9.2 | 100 | 80 | 61 | 51 | 44 | 40 |
| | 11.5 | 100 | 80 | 61 | 53 | 46 | 42 |
| | 13.8 | 100 | 79 | 62 | 54 | 47 | 43 |
| | 16.1 | 100 | 79 | 64 | 56 | 49 | 46 |
| | 18.4 | 100 | 80 | 66 | 59 | 53 | 50 |
| | 20.7 | 100 | 82 | 72 | 66 | 60 | 58 |
| Example 3 | | | | | | | |
| Charles B. | 2.3 | 100 | 50 | 50 | 50 | 38 | 25 |
| Crystal | 6.9 | 100 | 75 | 82 | 82 | 86 | 89 |
| Bentonite/ | 9.2 | 100 | 86 | 91 | 89 | 89 | 89 |
| PTFE | 11.5 | 100 | 79 | 82 | 79 | 79 | 79 |
| | 13.8 | 100 | 72 | 72 | 70 | 70 | 69 |
| | 16.1 | 100 | 81 | 83 | 79 | 81 | 78 |
| | 18.4 | 100 | 85 | 86 | 84 | 83 | 83 |
| | 20.7 | 100 | 89 | 93 | 90 | 88 | 89 |
| Comparative Example 1 | | | | | | | |
| Transo-Pharm | 2.3 | 100 | 31 | 23 | 19 | 17 | 16 |
| silica gel | 6.9 | 100 | 22 | 16 | 12 | 11 | 9 |
| | 9.2 | 100 | 19 | 14 | 11 | 9 | 8 |
| | 11.5 | 100 | 24 | 12 | 9 | 8 | 7 |
| | 13.8 | 100 | 39 | 15 | 9 | 8 | 6 |
| | 16.1 | 100 | 50 | 31 | 12 | 9 | 7 |
| | 18.4 | 100 | 51 | 44 | 31 | 17 | 8 |
| | 20.7 | 100 | 52 | 46 | 42 | 31 | 18 |
| Comparative Example 2 | | | | | | | |
| Transo-Pharm | 2.3 | 100 | 48 | 36 | 33 | 9 | 9 |
| silica gel/ | 6.9 | 100 | 35 | 26 | 24 | 19 | 16 |
| PTFE | 9.2 | 100 | 30 | 21 | 19 | 15 | 13 |
| | 11.5 | 100 | 29 | 18 | 16 | 12 | 10 |
| | 13.8 | 100 | 40 | 19 | 16 | 10 | 8 |
| | 16.1 | 100 | 57 | 33 | 28 | 13 | 7 |
| | 18.4 | 100 | 69 | 54 | 49 | 30 | 9 |
| | 20.7 | 100 | 72 | 68 | 63 | 53 | 26 |

Polycarbonate Enclosure Examples

Examples 4-6 tested filled PTFE sorbent materials inside a polycarbonate enclosure containing octamethylcyclotetrasiloxane and benzyl alcohol. This test is considered to be a more demanding environment that simulates the conditions inside a string inverter. This difference is that continuous thermal cycling for the polycarbonate enclosure equates to 96 thermal cycles per week. Similar to the examples using the string inverter, after a defined period of thermal cycles, material samples are removed from the enclosure and characterized for water vapor adsorption capacity. The capacity of the cycled material is then compared to its initial capacity.

Example 4

A sorbent material utilizes a sorbent filled PTFE tape wherein the sorbent particles are entrapped within the regular PTFE structure as taught by U.S. Pat. No. 4,985,296. The sorbent material used in this tape example is bentonite powder (Part No. A15795, from Alfa Aesar) having CAS number 1302-78-9. The filled tape was characterized for water vapor sorption capacity at 25° C. on a VTI SGA-100 sorption system.

A test apparatus was designed to allow sorbent tapes to be thermally cycled inside a polycarbonate box (Item AR12106CHSSLT, from Solutions Direct Online). The apparatus had eight locations to test sorbent tapes. Each location used custom stereolithography printed pieces to restrain copper heating pans. The stereolithography printed pieces were made on 3D Systems Viper SLA system with Somos PerFORM resin. The copper pans were cut from multipurpose 110 copper sheets (Part No. 8963K36, from McMaster-Carr) and measured 1.25 inches by 1.625 inches. Heat is applied to each pan via a positive temperature coefficient thermistor (Part No. SOP5173-11, from Thermistors Unlimited, INC). The thermistor is mounted to the underside of the pan with a thermally and electrically conductive epoxy (Part No. AA-Duct 902, from Atom Adhesives). The thermistors reach a maximum temperature of 155° C. The apparatus was mounted inside the polycarbonate enclosure. The enclosure was placed in an oven maintained at 35° C.

The enclosure additionally contained two open jars loaded with chemicals. One jar initially contained 15 ml of octamethylcyclotetrasiloxane. The other jar initially contained 15 ml of benzyl alcohol. The jars were replenished with 15 ml of each chemical during the experiment.

A 1.25 inch by 1.63 inch by 0.08 inch piece of Alfa Aesar Bentonite-PTFE tape was compressed on a heating pan within the enclosure. The sorbent material in was thermally cycled as follows: A custom electrical control system applied 24V DC to the thermistor for 15 minutes to desorb moisture from the sorbent material. The thermistor regenerates the sorbent material at 155° C. After the 15 minute heating step, the thermistor is shut off and the sorbent is allowed to adsorb ambient moisture for 90 minutes. During the adsorption step, two axial bladed fans (Part No. 9GA0624G702-ND, from Digikey) are turned on for the 90 minute duration to mix the air above the sorbent and increase mass transport into the sorbent. This thermal cycling is continuous and equates to 96 thermal cycles per week.

After periods of thermal cycling, a 20 to 30 mg sample of sorbent tape is removed from the enclosure. The material was characterized for water vapor sorption capacity at 25° C. on a VTI SGA-100 sorption system. In the sorption capacity characterization, the material is regenerated to 125° C. Table 3 shows the capacity of Alfa Aesar bentonite PTFE tape at various water vapor concentrations as a function of thermal cycles inside the polycarbonate enclosure.

Figure 24:
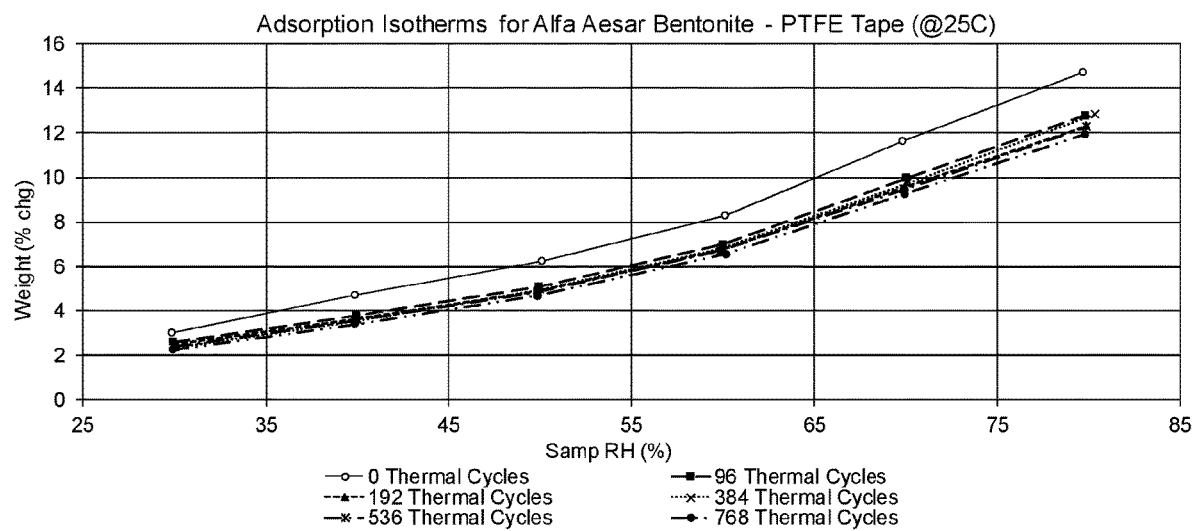
FIGS. 24 and 25 are graphs of the testing for Example 4.
Figure 25:
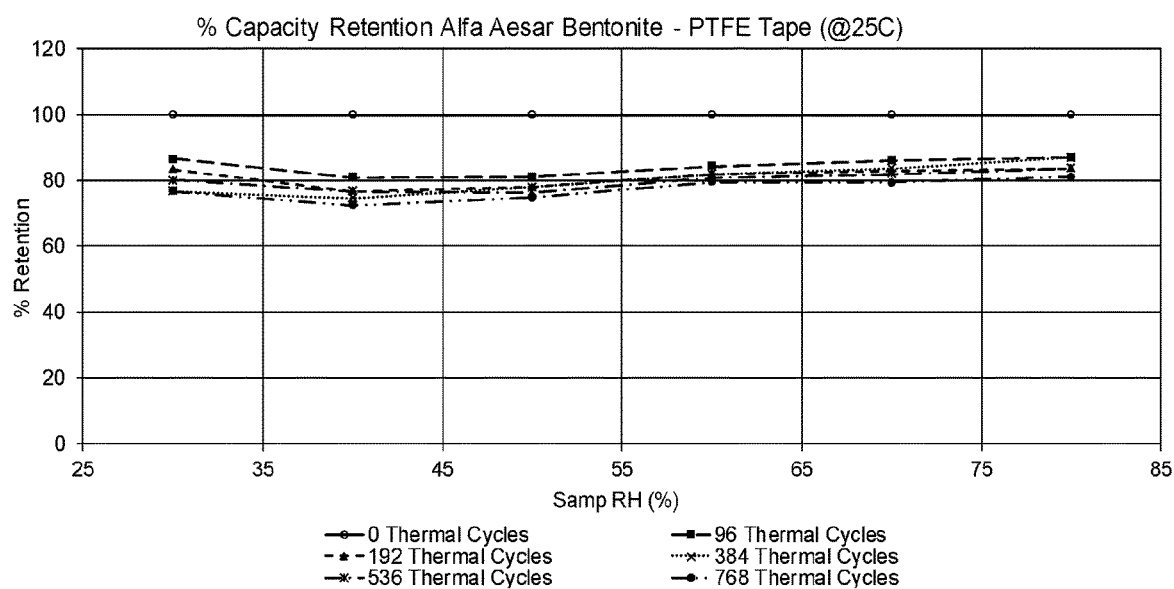

As shown in FIG. 24, the weight change % is robust from 96 to 768 cycles across the humidity range of 30-80%. FIG. 25 shows that Example 4 has a high moisture capacity retention.

Example 5

Example 4 is repeated with a different sorbent material. The filled PTFE tape for this example uses bentonite powder (Bulk NatraSorb M, DSR6212, from Multisorb Technologies) having CAS number 1302-78-9. The sorbent material in was thermally cycled as described in Example 4.

Figure 26:
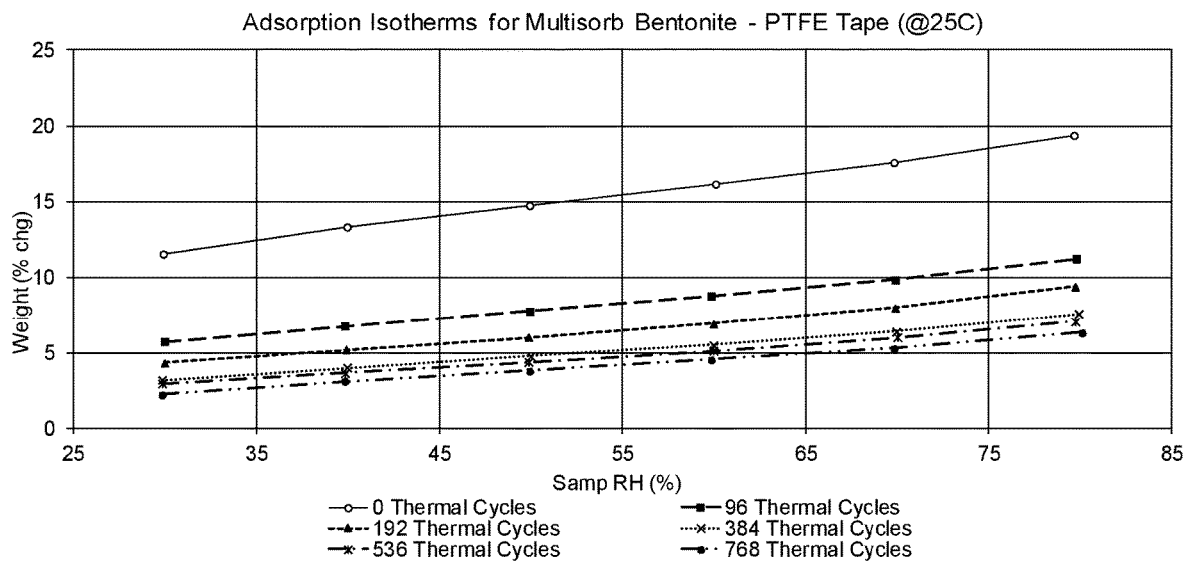
FIGS. 26 and 27 are graphs of the testing for Example 5.
Figure 27:
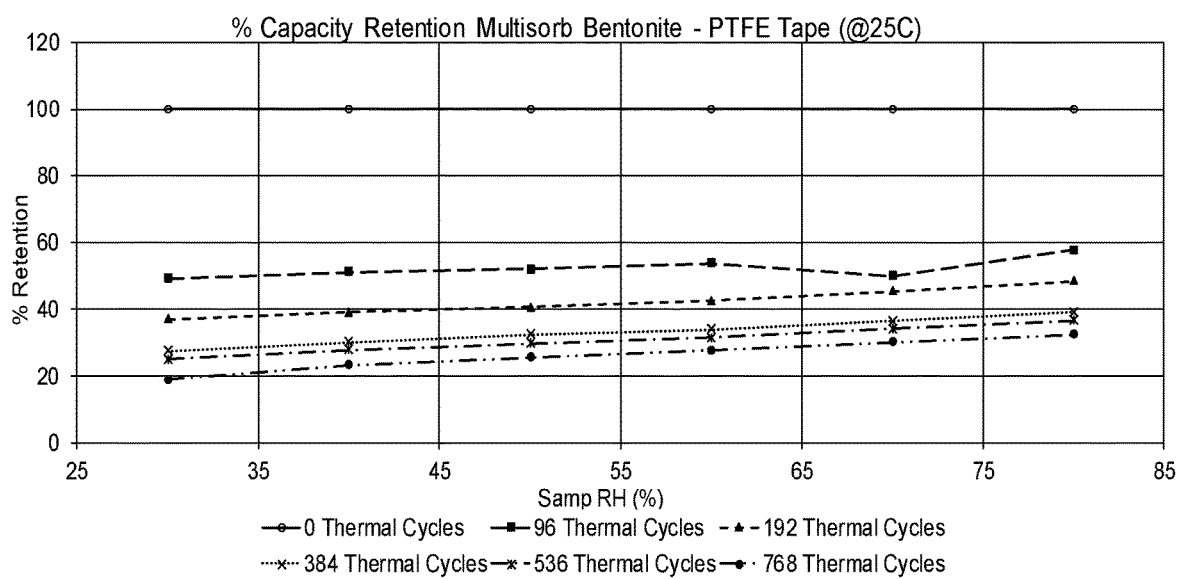

As shown in FIG. 26, the weight change % is robust from 96 to 768 cycles across the humidity range of 30-80%. FIG. 27 shows that Example 5 has a good moisture capacity retention.

Example 6

Example 4 is repeated with a different sorbent material. The filled PTFE tape for this example uses bentonite powder (Sodium Montmorillonite Clay, 638MCP8CM25, from Sorbent Systems) having CAS number 1318-93-0, and designated of more than 95% montmorillonite. The sorbent material in was thermally cycled as described in Example 4.

Figure 28:
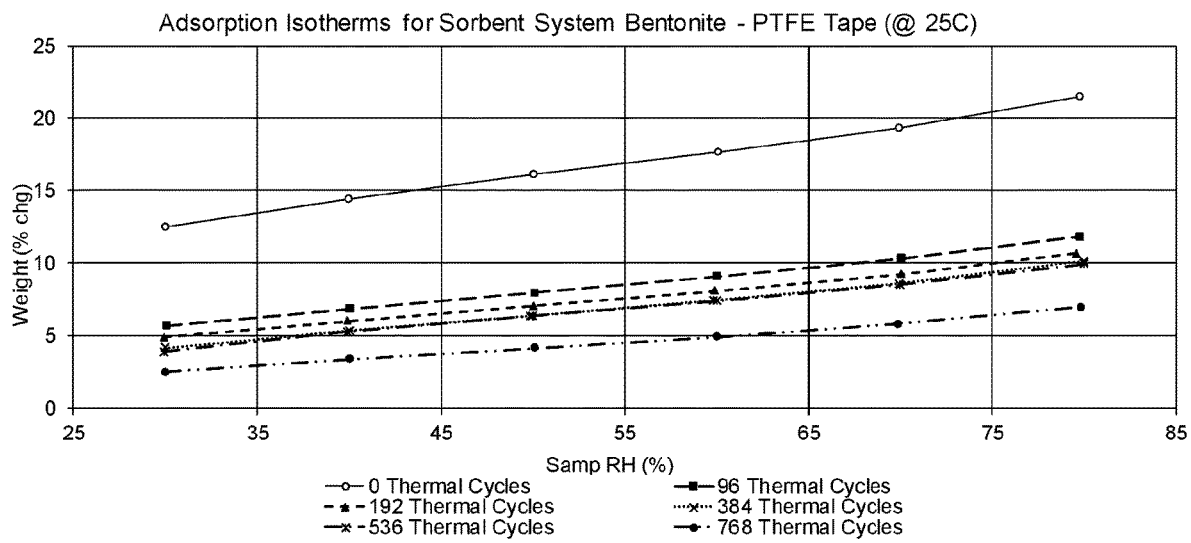
FIGS. 28 and 29 are graphs of the testing for Example 6.
Figure 29:
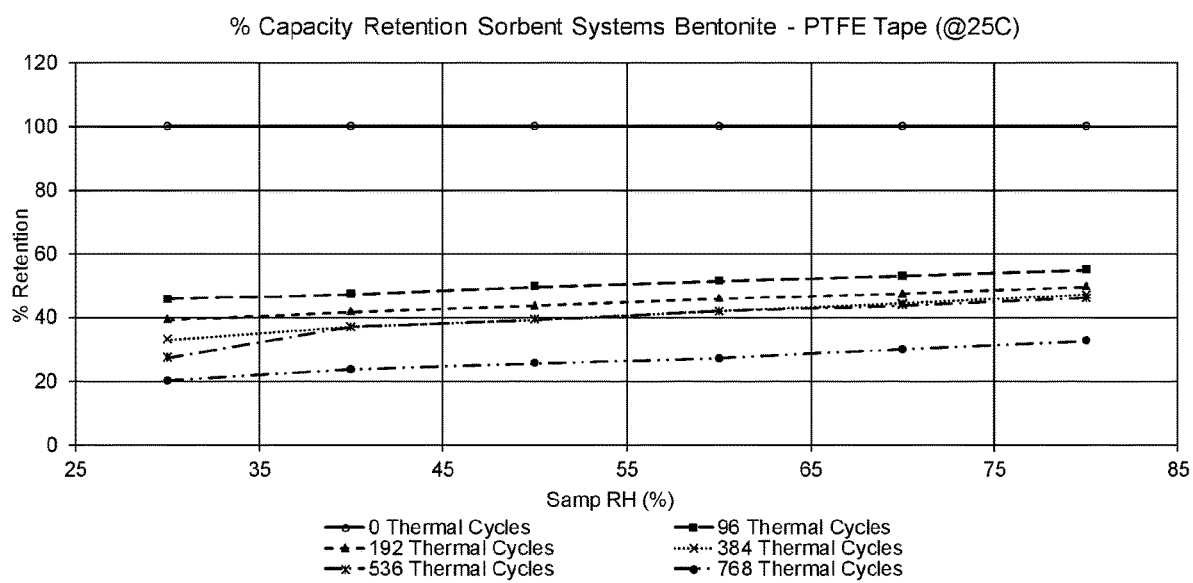

As shown in FIG. 28, the weight change % is robust from 96 to 768 cycles across this humidity range. FIG. 29 shows that Example 6 has a good moisture capacity retention.

Comparative Example 3

A filled PTFE tape was tested using the silica gel powder (Type A, from Transo-Pharm USA) from comparative example 2. The loading of the silica gel powder was about 80%, based on the total weight of the desiccant member. The testing was under the same conditions as example 4 and the results are compared in the following tables.

Figure 30:
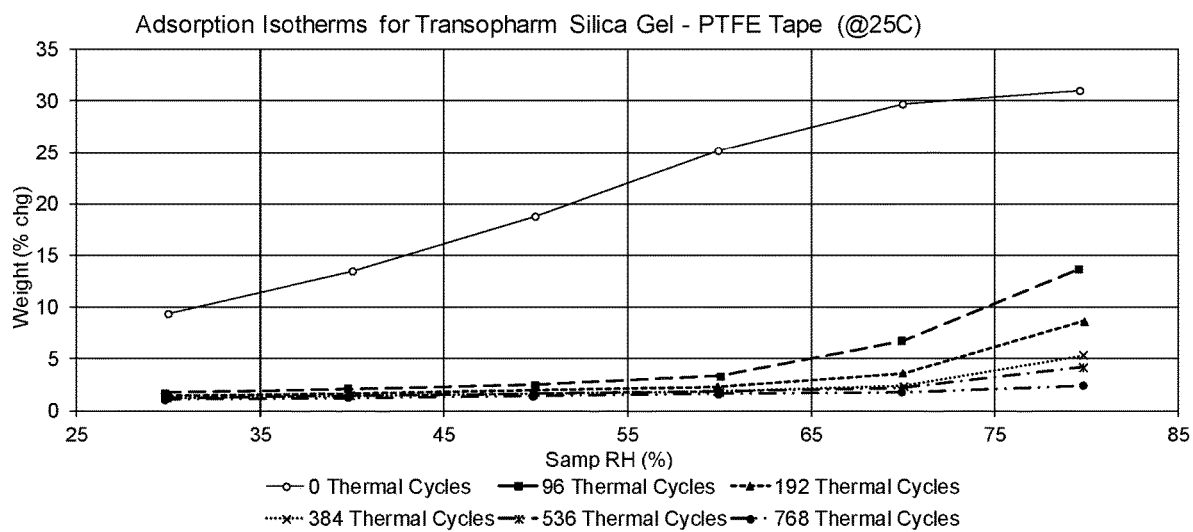
FIGS. 30 and 31 are graphs of the testing for Comparative Example 3.
Figure 31:
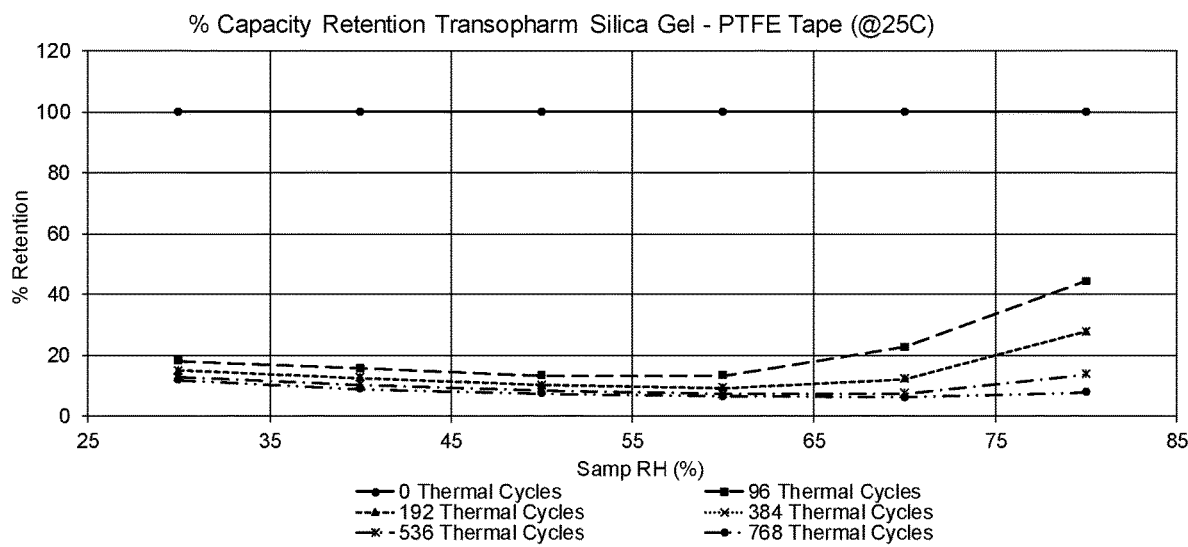

FIG. 30 is a graph from showing the adsorption isotherm in term of weight change % from 30% to 80% relative humidity, and a noticeable drop in weight change % is shown by comparative example 3. FIG. 31 shows that comparative example 2 has a low moisture capacity retention. This makes comparative example 3 unsuitable for long term applications in demanding environments.

Figure 32:
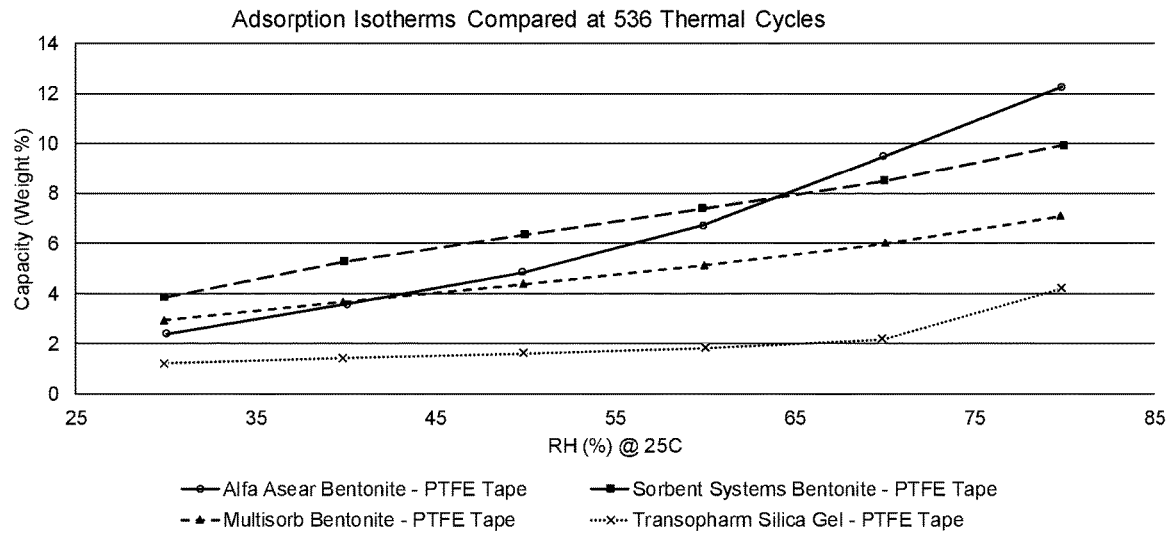
FIGS. 32 and 33 are comparison graphs of Examples 4-6 and Comparative Example 3 at 536 cycles.

At 536 cycles, approximately one year of testing, there is a significant improvement in adsorption isotherm in term of weight change % in Examples 4-6 over comparative example 3 as shown in FIG. 32 and moisture capacity retention in FIG. 33.

Table 3 shows the water vapor sorption capacity of Alfa Aesar bentonite filled PTFE tape, Multisorb bentonite filled PTFE tape, Sorbent Systems bentonite filled PTFE tape, and Transo-Pharm silica gel filled PTFE tape at various water vapor concentrations as a function of thermal cycles in a polycarbonate enclosure containing octamethylcyclotetrasiloxane and benzyl alcohol.

TABLE 3

| Sorbent Material | Moisture Content @25° C. (g/m3) | Water Vapor Sorption Capacity (% Weight Gain) | | | | | |
|---|---|---|---|---|---|---|---|
| | | 0 Cycles (Initial) | 96 Cycles | 192 Cycles | 392 Cycles | 536 Cycles | 768 cycles |
| Example 4 | | | | | | | |
| Alfa Aesar Bentonite/ PTFE | 2.3 | 0.8 | 0.5 | 0.4 | 0.4 | 0.4 | 0.4 |
| | 6.9 | 3 | 2.6 | 2.5 | 2.3 | 2.4 | 2.3 |
| | 9.2 | 4.7 | 3.8 | 3.6 | 3.5 | 3.6 | 3.4 |
| | 11.5 | 6.3 | 5.1 | 4.9 | 4.9 | 4.8 | 4.7 |
| | 13.8 | 8.3 | 7 | 6.8 | 6.8 | 6.7 | 6.6 |
| | 16.1 | 11.6 | 10 | 9.6 | 9.7 | 9.5 | 9.2 |
| | 18.4 | 14.7 | 12.8 | 12.3 | 12.8 | 12.3 | 11.9 |
| | 20.7 | 18.6 | 16.6 | 16.2 | 16.9 | 16.3 | 15.8 |
| Example 5 | | | | | | | |
| Multisorb Bentonite/ PTFE | 2.3 | 5.9 | 3.0 | 2.1 | 1.0 | 1.2 | 0.6 |
| | 6.9 | 11.6 | 5.7 | 4.3 | 3.2 | 2.9 | 2.2 |
| | 9.2 | 13.3 | 6.8 | 5.2 | 4 | 3.7 | 3.1 |
| | 11.5 | 14.8 | 7.7 | 6.0 | 4.8 | 4.4 | 3.8 |
| | 13.8 | 16.2 | 8.7 | 6.9 | 5.5 | 5.1 | 4.5 |
| | 16.1 | 17.6 | 8.8 | 8 | 6.4 | 6 | 5.3 |
| | 18.4 | 19.4 | 11.2 | 9.4 | 7.6 | 7.1 | 6.3 |
| | 20.7 | 22.3 | 13.6 | 12.1 | 9.8 | 9.3 | 8.1 |
| Example 6 | | | | | | | |
| Sorbent Systems Bentonite/ PTFE | 2.3 | 6.6 | 2.4 | 1.3 | 0.6 | 0.4 | 0.2 |
| | 6.9 | 12.5 | 5.7 | 4.9 | 4.1 | 3.4 | 2.5 |
| | 9.2 | 14.4 | 6.8 | 6 | 5.3 | 5.3 | 3.4 |
| | 11.5 | 16.1 | 8.0 | 7.0 | 6.3 | 6.3 | 4.1 |

TABLE 3-continued

| Sorbent Material | Moisture Content @25° C. (g/m3) | Water Vapor Sorption Capacity (% Weight Gain) | | | | | |
|---|---|---|---|---|---|---|---|
| | | 0 Cycles (Initial) | 96 Cycles | 192 Cycles | 392 Cycles | 536 Cycles | 768 cycles |
| | 13.8 | 17.7 | 9.1 | 8.1 | 7.4 | 7.4 | 4.8 |
| | 16.1 | 19.4 | 10.3 | 9.2 | 8.6 | 8.5 | 5.8 |
| | 18.4 | 21.5 | 11.8 | 10.7 | 10.1 | 9.9 | 7 |
| | 20.7 | 25.1 | 14.5 | 13.6 | 12.9 | 12.7 | 12.0 |
| Comparative Example 3 | | | | | | | |
| Transo-Pharm silica gel/ PTFE | 2.3 | 3.4 | 0.9 | 0.7 | 0.7 | 0.7 | 0.6 |
| | 6.9 | 9.4 | 1.7 | 1.4 | 1.2 | 1.2 | 1.1 |
| | 9.2 | 13.5 | 2.1 | 1.7 | 1.4 | 1.4 | 1.2 |
| | 11.5 | 18.8 | 2.5 | 1.9 | 1.7 | 1.6 | 1.4 |
| | 13.8 | 25.1 | 3.3 | 2.3 | 1.9 | 1.8 | 1.6 |
| | 16.1 | 29.7 | 6.7 | 3.6 | 2.4 | 2.2 | 1.8 |
| | 18.4 | 31 | 13.7 | 8.6 | 5.3 | 4.2 | 2.4 |
| | 20.7 | 31.7 | 18.2 | 16.6 | 13.6 | 13.9 | 8 |

Table 4 shows the percent of water vapor sorption capacity retained of Alfa Aesar bentonite filled PTFE tape, Multisorb bentonite filled PTFE tape, Sorbent Systems bentonite filled PTFE tape, and Transo-Pharm silica gel filled PTFE tape at various water vapor concentrations as a function of thermal cycles in a polycarbonate enclosure containing octamethylcyclotetrasiloxane and benzyl alcohol. Example 4 demonstrates robust performance at different relative humidity and over short and long cycle periods. Examples 5 and 6 demonstrate improved performance from 30 to 80% relative humidity and are comparable to silica gel at lower or higher humidity conditions in this test.

TABLE 4

| Sorbent Material | Moisture Content @25° C. (g/m3) | Percent Water Vapor Sorption Capacity Retained Compared to Initial (%) | | | | | |
|---|---|---|---|---|---|---|---|
| | | 0 Cycles (Initial) | 96 Cycles | 192 Cycles | 392 Cycles | 536 Cycles | 768 Cycles |
| Example 4 | | | | | | | |
| Alfa Aesar Bentonite/ PTFE | 2.3 | 100 | 63 | 50 | 50 | 50 | 50 |
| | 6.9 | 100 | 87 | 83 | 77 | 80 | 77 |
| | 9.2 | 100 | 81 | 77 | 74 | 77 | 72 |
| | 11.5 | 100 | 81 | 78 | 78 | 76 | 75 |
| | 13.8 | 100 | 84 | 82 | 82 | 81 | 80 |
| | 16.1 | 100 | 86 | 83 | 84 | 82 | 79 |
| | 18.4 | 100 | 87 | 84 | 87 | 84 | 81 |
| | 20.7 | 100 | 89 | 87 | 91 | 88 | 85 |
| Example 5 | | | | | | | |
| Multisorb Bentonite/ PTFE | 2.3 | 100 | 51 | 36 | 17 | 20 | 10 |
| | 6.9 | 100 | 49 | 37 | 28 | 25 | 19 |
| | 9.2 | 100 | 51 | 39 | 30 | 28 | 23 |
| | 11.5 | 100 | 52 | 41 | 32 | 30 | 26 |
| | 13.8 | 100 | 54 | 43 | 34 | 31 | 28 |
| | 16.1 | 100 | 50 | 45 | 36 | 34 | 30 |
| | 18.4 | 100 | 58 | 48 | 39 | 37 | 32 |
| | 20.7 | 100 | 61 | 54 | 44 | 42 | 36 |
| Example 6 | | | | | | | |
| Sorbent Systems Bentonite/ PTFE | 2.3 | 100 | 36 | 20 | 9 | 6 | 3 |
| | 6.9 | 100 | 46 | 39 | 33 | 27 | 20 |
| | 9.2 | 100 | 47 | 42 | 37 | 37 | 24 |
| | 11.5 | 100 | 50 | 43 | 39 | 39 | 25 |
| | 13.8 | 100 | 51 | 46 | 42 | 42 | 27 |
| | 16.1 | 100 | 53 | 47 | 44 | 44 | 30 |
| | 18.4 | 100 | 55 | 50 | 47 | 46 | 33 |
| | 20.7 | 100 | 58 | 54 | 51 | 51 | 48 |
| Comparative Example 3 | | | | | | | |
| Transo-Pharm silica gel/ PTFE | 2.3 | 100 | 26 | 21 | 21 | 21 | 18 |
| | 6.9 | 100 | 18 | 15 | 13 | 13 | 12 |
| | 9.2 | 100 | 16 | 13 | 10 | 10 | 9 |
| | 11.5 | 100 | 13 | 10 | 9 | 9 | 7 |
| | 13.8 | 100 | 13 | 9 | 8 | 7 | 6 |

TABLE 4-continued

| Sorbent Material | Moisture Content @25° C. (g/m3) | 0 Cycles (Initial) | 96 Cycles | 192 Cycles | 392 Cycles | 536 Cycles | 768 Cycles |
|---|---|---|---|---|---|---|---|
| | 16.1 | 100 | 23 | 12 | 8 | 7 | 6 |
| | 18.4 | 100 | 44 | 28 | 17 | 14 | 8 |
| | 20.7 | 100 | 57 | 52 | 43 | 44 | 25 |

Various modifications and additions can be made to the exemplary embodiments discussed without departing from the scope of the present invention. While the embodiments described above refer to particular features, the scope of this invention also includes embodiments having different combinations of features and embodiments that do not include all of the above described features.

The following is claimed:

1. An enclosure assembly comprising:
   a. a housing comprising:
      i. a first chamber having a heater,
      ii. at least one adsorption port into the first chamber, and
      iii. a desiccant member disposed proximate to the at least one adsorption port, the desiccant member comprising:
         1. a polymer material; and
         2. a bentonite material;
         wherein the desiccant member is capable of maintaining a working moisture capacity in a regenerable manner while absorbing moisture from an atmosphere containing siloxanes, organic compounds having a boiling point greater than 60° C., or mixtures thereof;
   b. a valve assembly located within the housing and being transitionable between an adsorption position and a desorption position.

2. The enclosure assembly of claim 1, wherein the housing further comprises a venting port out of the first chamber and wherein the adsorption position seals a desorption port between the first chamber and the venting port and opens the adsorption port into the first chamber for water vapor transmission into the first chamber.

3. The enclosure assembly of claim 1, wherein the desiccant member is flexible.

4. The enclosure assembly of claim 1, wherein the bentonite material comprises sodium bentonite, calcium bentonite, one or more phyllosilicates, or mixtures thereof.

5. The enclosure assembly of claim 1, wherein the polymer material comprises polyolefins, polyurethanes, or fluoropolymers.

6. The enclosure assembly of claim 1, wherein the moisture capacity of the bentonite material is substantially retained after being regenerated.

7. The enclosure assembly of claim 1, wherein the working moisture capacity is greater than 10% of the initial moisture capacity at 11.5 g/m³ water vapor concentration and 536 regeneration cycles.

8. The enclosure assembly of claim 1 wherein the desiccant member has a thickness from 0.1 to 15 mm.

9. The enclosure assembly of claim 1, wherein the desiccant member desorbs moisture at a temperature that is greater than the boiling point of the organics in the atmosphere.

10. The enclosure assembly of claim 1, wherein the polymer material is a porous polymer matrix and the bentonite material is positioned within the porous polymer matrix.

11. The enclosure assembly of claim 10, wherein loading of the bentonite material in the porous polymer matrix is from 50 to 99%, based on the total weight of the desiccant member.

12. The enclosure assembly of claim 1, wherein the polymer material is a layer adjacent to the bentonite material.

13. The enclosure assembly of claim 12, wherein the porous polymer matrix encapsulates the bentonite material to form a pouch.

14. The enclosure assembly of claim 1 further comprising one or more beads of the bentonite material is adhered to a surface of the polymer material.

15. The enclosure assembly of claim 1, wherein the siloxanes concentration in the atmosphere is at least 1 ppm or more.

16. The enclosure assembly of claim 4, wherein the one or more phyllosilicates comprises montmorillonite, saponite, beidellite, and/or hectorite.

17. The enclosure assembly of claim 1, wherein the working moisture capacity is greater than 15% of the initial moisture capacity at 11.5 g/m³ water vapor concentration and 536 regeneration cycles.

18. An enclosure assembly comprising:
   a. a housing comprising:
      i. a first chamber having a heater,
      ii. at least one adsorption port extending into the first chamber, and
      iii. a desiccant member disposed proximate to the at least one adsorption port,
         wherein the desiccant member comprises:
            1. at least one polymer material; and
            2. at least one bentonite material; and
   b. a valve assembly located within the housing wherein the valve assembly has an adsorption position and a desorption position;
   wherein the enclosure assembly is configured to adsorb moisture from an atmosphere, wherein the atmosphere comprises: siloxanes, organic compounds having a boiling point greater than 60° C., or mixtures thereof.

* * * * *